(12) United States Patent
Alrabadi et al.

(10) Patent No.: US 12,531,618 B2
(45) Date of Patent: Jan. 20, 2026

(54) PARTIAL ANTENNA UPLINK SOUNDING

(71) Applicant: QUALCOMM Incorporated, San Diego, CA (US)

(72) Inventors: Osama Alrabadi, Nuremberg (DE); Pramod Jacob Mathecken, Espoo (FI); Andrea Garavaglia, Nuremberg (DE); Mark Wallace, Bedford, MA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 18/499,962

(22) Filed: Nov. 1, 2023

(65) Prior Publication Data

US 2025/0141526 A1    May 1, 2025

(51) Int. Cl.
*H04B 7/06* (2006.01)
*H04W 28/02* (2009.01)
*H04W 72/1268* (2023.01)

(52) U.S. Cl.
CPC ...... *H04B 7/0691* (2013.01); *H04W 28/0215* (2013.01); *H04W 72/1268* (2013.01)

(58) Field of Classification Search
CPC ............ H04B 7/0691; H04W 28/0215; H04W 72/1268
See application file for complete search history.

(56) References Cited

U.S. PATENT DOCUMENTS

2024/0080086 A1*  3/2024  Nilsson ................ H04B 7/0874

* cited by examiner

*Primary Examiner* — Janice N Tieu
(74) *Attorney, Agent, or Firm* — QUALCOMM Incorporated

(57) ABSTRACT

Methods, systems, and devices for wireless communications are described. A user equipment (UE) may transmit a first capability message to a network entity indicating that the UE may be capable of using a subset of antenna ports of a set of antenna ports for uplink sounding on a wireless band. Further, one or more antenna ports of the set of antenna ports may be available for the uplink sounding and the first capability message may include an indication of the set of antenna ports. The UE may then receive control signaling from the network entity indicating the subset of antenna ports that the UE should use for the uplink sounding based on the first capability message. As such, as part of the uplink sounding on the wireless band, the UE may transmit one or more sounding reference signals (SRSs) via the subset of antenna ports indicated by the control signaling.

24 Claims, 15 Drawing Sheets

PARTIAL ANTENNA UPLINK SOUNDING

FIELD OF TECHNOLOGY

The following relates to wireless communications, including partial antenna uplink sounding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may include UEs performing uplink sounding to connect with a network entity. As part of the uplink sounding, UEs may transmit, via an uplink channel, one or more sounding reference signals (SRSs) to a network entity via a set of antenna ports at the UE. The network entity may use the SRSs to estimate the channel quality of the uplink channel and manage subsequent resource scheduling, beam management, and power control for the UE via the uplink channel.

SUMMARY

The described techniques relate to improved methods, systems, devices, and apparatuses that support partial antenna uplink sounding. For example, the described techniques provide for a UE transmitting a first capability message to a network entity indicating that the UE may be capable of using a subset of antenna ports of a set of antenna ports of uplink sounding on a wireless band. Further, one or more antenna ports of the set of antenna ports may be available for the uplink sounding and the first capability message may include an indication of the set of antenna ports. The UE may then receive control signaling from the network entity indicating the subset of antenna ports of the set of antenna ports that the UE should use for the uplink sounding, where the control signaling may be based on the first capability message. As such, as part of the uplink sounding on the wireless band, the UE may transmit one or more sounding reference signals (SRSs) via the subset of antenna ports indicated by the control signaling.

A method for wireless communications by a UE is described. The method may include transmitting, to a network entity, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports, receiving, from the network entity, control signaling indicating the subset of antenna ports of the set of multiple antenna ports that the UE is to use for the uplink sounding, the control signaling being based on the first capability message, and transmitting, to the network entity, one or more SRSs via the subset of antenna ports indicated by the control signaling as part of the uplink sounding on the wireless band.

A UE for wireless communications is described. The UE may include one or more memories storing processor executable code, and one or more processors coupled with the one or more memories. The one or more processors may individually or collectively operable to execute the code to cause the UE to transmit, to a network entity, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports, receive, from the network entity, control signaling indicating the subset of antenna ports of the set of multiple antenna ports that the UE is to use for the uplink sounding, the control signaling being based on the first capability message, and transmit, to the network entity, one or more SRSs via the subset of antenna ports indicated by the control signaling as part of the uplink sounding on the wireless band.

Another UE for wireless communications is described. The UE may include means for transmitting, to a network entity, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports, means for receiving, from the network entity, control signaling indicating the subset of antenna ports of the set of multiple antenna ports that the UE is to use for the uplink sounding, the control signaling being based on the first capability message, and means for transmitting, to the network entity, one or more SRSs via the subset of antenna ports indicated by the control signaling as part of the uplink sounding on the wireless band.

A non-transitory computer-readable medium storing code for wireless communications is described. The code may include instructions executable by a processor to transmit, to a network entity, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports, receive, from the network entity, control signaling indicating the subset of antenna ports of the set of multiple antenna ports that the UE is to use for the uplink sounding, the control signaling being based on the first capability message, and transmit, to the network entity, one or more SRSs via the subset of antenna ports indicated by the control signaling as part of the uplink sounding on the wireless band.

Some examples of the method, UEs, and non-transitory computer-readable medium described herein may further include operations, features, means, or instructions for transmitting, to the network entity, a second capability message including an indication of a second set of multiple antenna ports at the UE, one or more antenna ports of the second set of multiple antenna ports being available for the uplink sounding, where the second set of multiple antenna ports being different from the set of multiple antenna ports and receiving, from the network entity, a second control signaling indicating the subset of antenna ports of the second set of multiple antenna ports that the UE may be to use for the uplink sounding, the second control signaling being based on the second capability message, where the one or more SRSs may be transmitted via the subset of antenna ports indicated by the second control signaling.

In some examples of the method, UEs, and non-transitory computer-readable medium described herein, receiving the control signaling may include operations, features, means, or instructions for receiving, from the network entity, a bitmap including the control signaling, each bit of the bitmap being associated with a respective antenna port of the set of multiple antenna ports, where the control signaling indicates the subset of antenna ports that the UE may be to use for the uplink sounding based on a respective value of each bit of the bitmap.

In some examples of the method, UEs, and non-transitory computer-readable medium described herein, the bitmap indicates that the UE should refrain from using a respective antenna port of the set of multiple antenna ports for the uplink sounding based on the respective value of a bit of the bitmap that may be associated with the respective antenna port being a null value.

In some examples of the method, UEs, and non-transitory computer-readable medium described herein, the bitmap may be received via a downlink control information (DCI) message, a radio resource control (RRC) message, a medium access control control element (MAC-CE) message, or any combination thereof.

In some examples of the method, UEs, and non-transitory computer-readable medium described herein, transmitting the first capability message may include operations, features, means, or instructions for transmitting, to the network entity, the first capability message including the indication of the set of multiple antenna ports at the UE, the set of multiple antenna ports being a subset of a plurality antenna ports configured at the UE, where the subset of antenna ports indicated by the control signaling may be the same as the set of multiple antenna ports indicated by the first capability message.

Some examples of the method, UEs, and non-transitory computer-readable medium described herein may further include operations, features, means, or instructions for transmitting, to the network entity, the first capability message that indicates that the UE may be capable of using a subset of antenna ports of the set of multiple antenna ports for the uplink sounding and indicates that the UE may be capable of using the one or more antenna ports of the set of multiple antenna ports for the uplink sounding based on the one or more antenna ports of the set of multiple antenna ports being available for the uplink sounding, receiving, from the network entity, a second control signaling indicating that the UE may be to use the one or more antenna ports of the set of multiple antenna ports for the uplink sounding, and receiving, from the network entity, the control signaling indicating the subset of antenna ports that the UE may be to use for the uplink sounding, the control signaling being based on the first capability message, where the control signaling may be received after the second control signaling and indicates that the UE may be to use the subset of antenna ports for the uplink sounding based on a transmission power level of a respective one or more antenna ports of the set of multiple antenna ports satisfying a transmission power level threshold.

In some examples of the method, UEs, and non-transitory computer-readable medium described herein, transmitting the one or more SRSs may include operations, features, means, or instructions for transmitting, to the network entity, the one or more SRSs via one or more SRS resources.

Some examples of the method, UEs, and non-transitory computer-readable medium described herein may further include operations, features, means, or instructions for transmitting the first capability message may be based on a type of receiver associated with the set of multiple antenna ports at the UE that may be available for the uplink sounding.

A method for wireless communications by a network entity is described. The method may include receiving, from a UE, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports, transmitting, to the UE, control signaling indicating the subset of antenna ports of the set of multiple antenna ports that the UE is to use for the uplink sounding, the control signaling being based on the first capability message, and receiving, from the UE, one or more SRSs via the subset of antenna ports indicated by the control signaling as part of the uplink sounding on the wireless band.

A network entity for wireless communications is described. The network entity may include one or more memories storing processor executable code, and one or more processors coupled with the one or more memories. The one or more processors may individually or collectively operable to execute the code to cause the network entity to receive, from a UE, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports, transmit, to the UE, control signaling indicating the subset of antenna ports of the set of multiple antenna ports that the UE is to use for the uplink sounding, the control signaling being based on the first capability message, and receive, from the UE, one or more SRSs via the subset of antenna ports indicated by the control signaling as part of the uplink sounding on the wireless band.

Another network entity for wireless communications is described. The network entity may include means for receiving, from a UE, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports, means for transmitting, to the UE, control signaling indicating the subset of antenna ports of the set of multiple antenna ports that the UE is to use for the uplink sounding, the control signaling being based on the first capability message, and means for receiving, from the UE, one or more SRSs via the subset of antenna ports indicated by the control signaling as part of the uplink sounding on the wireless band.

A non-transitory computer-readable medium storing code for wireless communications is described. The code may include instructions executable by a processor to receive, from a UE, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports, transmit, to the UE, control signaling indicating the subset of antenna ports of the set of multiple antenna ports that the UE is to use for the uplink sounding, the control signaling being based on the first capability message, and receive, from the UE, one or more SRSs via the subset of antenna ports indicated by the control signaling as part of the uplink sounding on the wireless band.

Some examples of the method, network entities, and non-transitory computer-readable medium described herein may further include operations, features, means, or instructions for receiving, from the UE, a second capability message including an indication of a second set of multiple antenna ports at the UE, one or more antenna ports of the second set of multiple antenna ports being available for the uplink sounding, where the second set of multiple antenna ports being different from the set of multiple antenna ports and transmitting, to the UE, a second control signaling indicating the subset of antenna ports of the second set of multiple antenna ports that the UE may be to use for the uplink sounding, the second control signaling being based on the second capability message, where the one or more SRSs may be transmitted via the subset of antenna ports indicated by the second control signaling.

In some examples of the method, network entities, and non-transitory computer-readable medium described herein, transmitting the control signaling may include operations, features, means, or instructions for transmitting, to the UE, a bitmap including the control signaling, each bit of the bitmap being associated with a respective antenna port of the set of multiple antenna ports, where the control signaling indicates the subset of antenna ports that the UE may be to use for the uplink sounding based on a respective value of each bit of the bitmap.

In some examples of the method, network entities, and non-transitory computer-readable medium described herein, the bitmap indicates that the UE should refrain from using a respective antenna port of the set of multiple antenna ports for the uplink sounding based on the respective value of a bit of the bitmap that may be associated with the respective antenna port being a null value.

In some examples of the method, network entities, and non-transitory computer-readable medium described herein, the bitmap may be transmitted via a DCI message, an RRC message, a MAC-CE message, or any combination thereof.

In some examples of the method, network entities, and non-transitory computer-readable medium described herein, receiving the first capability message may include operations, features, means, or instructions for receiving, from the UE, the first capability message including the indication of the set of multiple antenna ports at the UE, the set of multiple antenna ports being a subset of a plurality antenna ports configured at the UE, where the subset of antenna ports indicated by the control signaling may be the same as the set of multiple antenna ports indicated by the first capability message.

Some examples of the method, network entities, and non-transitory computer-readable medium described herein may further include operations, features, means, or instructions for receiving, from the UE, the first capability message that indicates that the UE may be capable of using a subset of antenna ports of the set of multiple antenna ports for the uplink sounding and indicates that the UE may be capable of using the one or more antenna ports of the set of multiple antenna ports for the uplink sounding based on the one or more antenna ports of the set of multiple antenna ports being available for the uplink sounding, transmitting, to the UE, a second control signaling indicating that the UE may be to use the one or more antenna ports of the set of multiple antenna ports for the uplink sounding, and transmitting, to the UE, the control signaling indicating the subset of antenna ports that the UE may be to use for the uplink sounding, the control signaling being based on the first capability message, where the control signaling may be received after the second control signaling and indicates that the UE may be to use the subset of antenna ports for the uplink sounding based on a transmission power level of a respective one or more antenna ports of the set of multiple antenna ports satisfying a transmission power level threshold.

In some examples of the method, network entities, and non-transitory computer-readable medium described herein, receiving the one or more SRSs may include operations, features, means, or instructions for receiving, from the UE, the one or more SRSs via one or more SRS resources.

DETAILED DESCRIPTION

Figure 1:
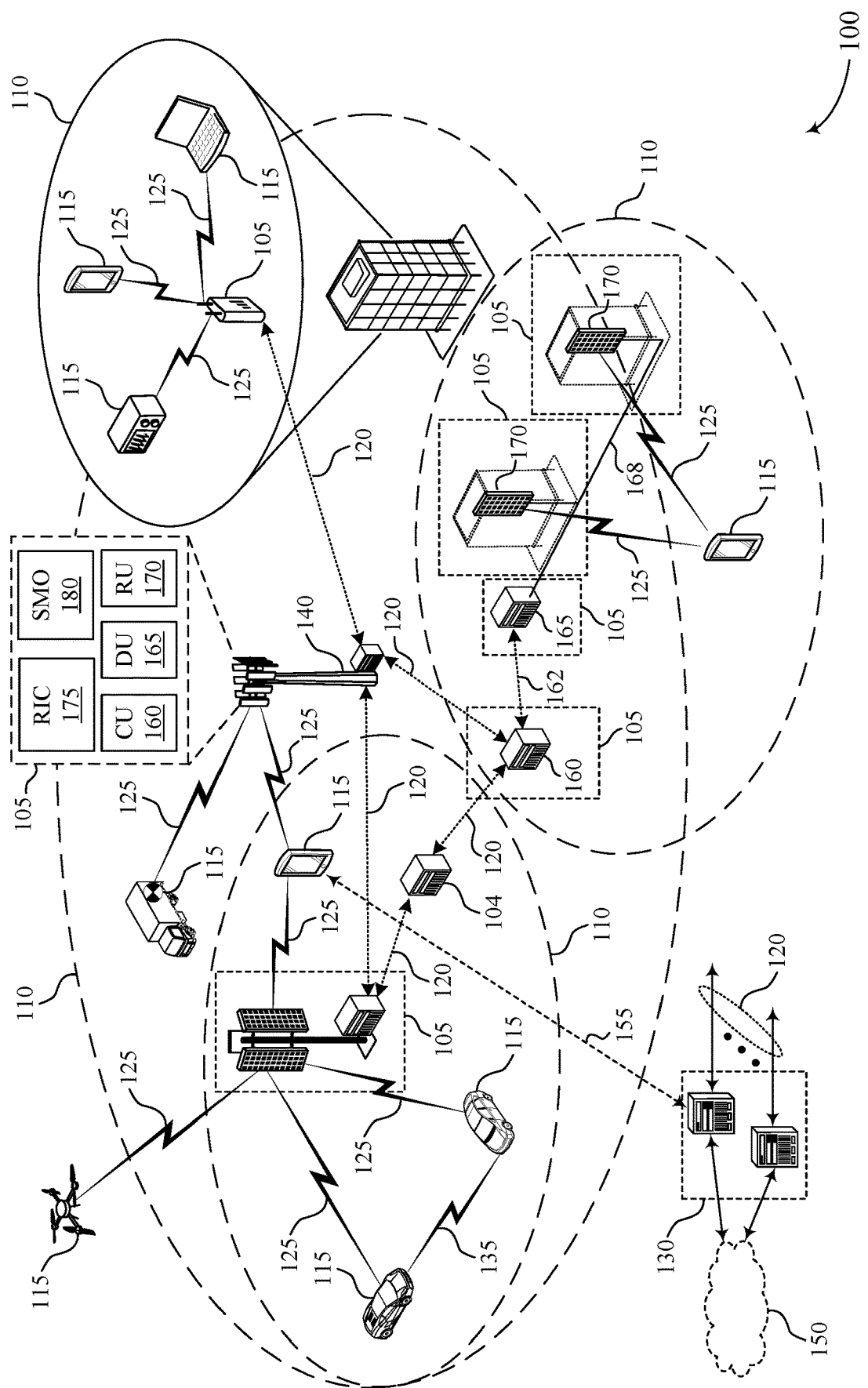
FIGS. 1 and 2 show examples of a wireless communications system that supports partial antenna uplink sounding in accordance with one or more aspects of the present disclosure.

In some wireless communication systems, user equipments (UEs) may perform uplink sounding with a network entity by transmitting one or more sounding reference signals (SRSs). A UE may transmit the one or more SRS to the network entity via an uplink channel via one or more antenna ports of the UE. Based on the network entity measuring the SRSs, the network entity may estimate the channel quality of the uplink channel between the UE and the network entity and may manage subsequent resource scheduling, beam management, and power control for the UE via the uplink channel. In some examples, the UE may use all the antenna ports at the UE to perform the uplink sounding. As such, the UE may transmit an SRS from each antenna port at the UE. However, in some cases, the UE may be within a cell supported by a network entity that may have a limited quantity of SRS resources. Therefore, since all the UEs within the cell perform uplink sounding with the network entity that supports the cell, the quantity of UEs that the network entity may support within the cell may be limited by the quantity of SRS resources.

Further, if a UE has four antenna ports, the UE may use all four antenna ports for the uplink sounding which signals to the network entity that the UE is capable of being configured with rank4 downlink communications (e.g., using four layers for downlink communications). However, the probability of a network entity configuring a UE with rank4 or even rank3 may be relatively low as such configurations may reduce the UEs ability to mitigate interference (e.g., external interference or from channel delegation). Therefore, the benefit of having the UE using all four antenna ports to perform uplink sounding with the network entity may be relatively low. As such, having the UE use all the antenna ports for uplink sounding may be inefficient. Further, having the UE using all the antenna ports for uplink sounding may result in a decrease in the quantity of SRS resources available for other UEs to perform uplink sounding thereby limiting the quantity of UEs that the network entity can support within the cell.

As such, the techniques of the present disclosure may describe the UE using a portion (e.g., a subset) of the available antenna ports for uplink sounding instead of all the available antenna ports. Such techniques may reduce the quantity of SRS resources that the UE consumes, thus increasing the quantity of UEs that the network entity can support within a cell. To support such configuration, the UE may transmit a capability message to a network entity indicating that the UE can perform uplink sounding using a subset of the antenna ports at the UE. Further, the capability message may also indicate the antenna ports that may be available at the UE for uplink sounding. As such, the network entity may then enable the UE, via control signaling, to use a subset of antenna ports for the uplink sounding. The control signaling may further indicate (e.g., via a bitmap) which antenna ports the UE should use from the antenna ports indicated as being available for the uplink sounding in the control message from the UE. Therefore, based on the control signaling the UE may perform the uplink sounding and transmit SRSs to the network entity using a subset of antenna ports instead of all the antenna ports at the UE. As such, the UE may consume fewer SRS resources than when using all the available antenna ports, therefore allowing additional UEs to be supported by the network entity within a cell. Further, by enabling the network entity to support additional UEs, the corresponding throughput levels of the cell may increase, and the overall latency of communications may decrease by ensuring UEs are supported by network entities.

Aspects of the disclosure are initially described in the context of wireless communications systems. Additional aspects of the disclosure are described with reference to a wireless communications system and a process flow. Aspects of the disclosure are further illustrated by and described with reference to apparatus diagrams, system diagrams, and flowcharts that relate to partial antenna uplink sounding.

FIG. 1 shows an example of a wireless communications system 100 that supports partial antenna uplink sounding in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115)

within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104.

Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support partial antenna uplink sounding as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $Ts=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, beamforming between a UE 115 and the network entity 105 may be reciprocity-based beamforming and may be based on sounding the antennas (e.g., the antenna elements or ports as described herein) of the UE 115 in the uplink direction using SRS signals. In some cases, in time division duplex (TDD) systems may use the same frequency band for both uplink and downlink transmissions. As such, the radio channels between the UE 115 and the network entity 105 may be reciprocal as the uplink channels and downlink channels may share the same characteristics. Therefore, in some examples, a network entity 105 may be capable of estimating the quality of the downlink channel based on the channel quality of the uplink channel.

In some examples of the wireless communications system 100, UEs 115 may perform uplink sounding with a network entity 105 by transmitting one or more SRSs. A UE 115 may transmit the one or more SRS to the network entity 105 via an uplink channel via one or more antenna ports of the UE 115. Based on the network entity 105 measuring the SRSs, the network entity 105 may estimate the channel quality of the uplink channel between the UE 115 and the network entity 105 and may manage subsequent resource scheduling, beam management, and power control for the UE 115 via the uplink channel. In some examples, the UE 115 may use all the antenna ports at the UE 115 to perform the uplink sounding. As such, the UE 115 may transmit an SRS from each antenna port at the UE 115. However, in some cases, the UE 115 may be within a cell (e.g., a coverage area 110) supported by a network entity 105 that may have a limited quantity of SRS resources. Therefore, since all the UEs 115 within the cell perform uplink sounding with the network entity 105 that supports the cell, the quantity of UEs 115 that the network entity 105 may support within the cell may be limited by the quantity of SRS resources.

Further, if a UE 115 has four antenna ports, the UE 115 may use all four antenna ports for the uplink sounding which signals to the network entity 105 that the UE 115 is capable of being configured with rank4 downlink communications (e.g., using four layers for downlink communications). However, the probability of a network entity 105 configuring a UE 115 with rank4 or even rank3 may be relatively low as such configurations may reduce the UEs 115 ability to mitigate interference (e.g., external interference or from channel delegation). Therefore, the benefit of having the UE 115 using all four antenna ports to perform uplink sounding with the network entity 105 may be relatively low. As such, having the UE 115 use all the antenna ports for uplink sounding may be inefficient. Further, having the UE 115 using all the antenna ports for uplink sounding may result in a decrease in the quantity of SRS resources available for other UEs 115 to perform uplink sounding thereby limiting the quantity of UEs 115 that the network entity 105 can support within the cell.

As such, the techniques of the present disclosure may describe the UE 115 using a portion (e.g., a subset) of the available antenna ports for uplink sounding instead of all the available antenna ports. Such techniques may reduce the quantity of SRS resources the UE 115 consumes, thus increasing the quantity of UEs 115 that the network entity 105 can support within a cell. To support such configuration, the UE 115 may transmit a capability message to a network entity 105 indicating that the UE 115 can perform uplink sounding using a subset of the antenna ports at the UE 115. Further, the capability message may also indicate the antenna ports that may be available at the UE 115 for uplink sounding. As such, the network entity 105 may then enable the UE 115, via control signaling, to use a subset of antenna ports for the uplink sounding. The control signaling may further indicate (e.g., via a bitmap) which antenna ports the UE 115 should use from the antenna ports indicated as being available for the uplink sounding in the control message from the UE 115. Therefore, based on the control signaling the UE 115 may perform the uplink sounding and transmit SRSs to the network entity 105 using a subset of antenna ports instead of all the antenna ports at the UE 115. As such, the UE 115 may consume fewer SRS resources than when using all the available antenna ports, therefore allowing additional UEs 115 to be supported by the network entity 105 within a cell. Further, by enabling the network entity 105 to support additional UEs 115, the corresponding throughput levels of the cell may increase and the overall latency of communications may decrease by ensuring UEs 115 are supported by network entities 105.

Figure 2:
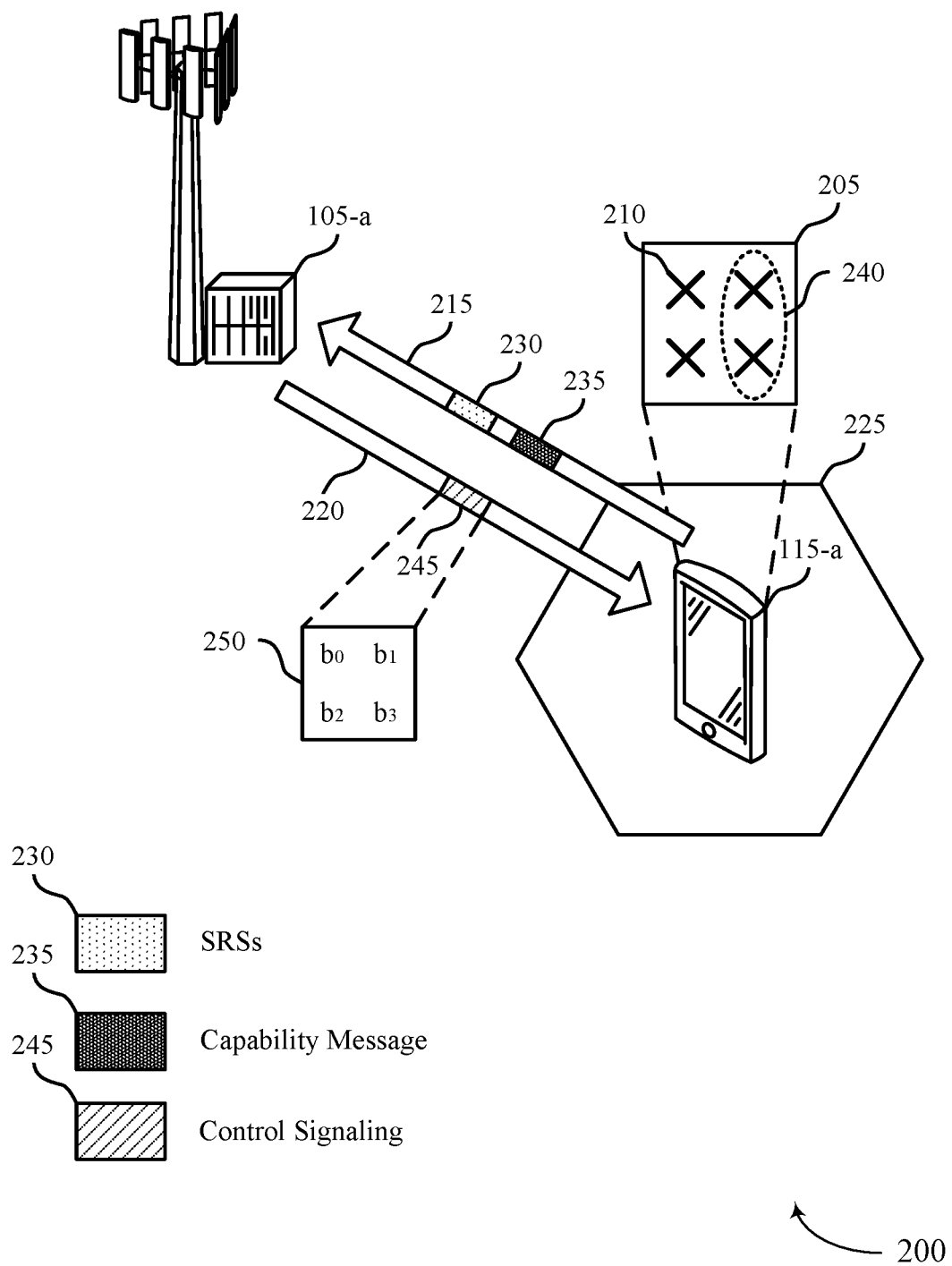

FIG. 2 shows an example of a wireless communications system 200 that supports partial antenna uplink sounding in accordance with one or more aspects of the present disclosure. In some examples, the wireless communications system 200 may implement or be implemented by the wireless communications system 100. For example, the wireless communications system 200 may include a network entity 105-a and a UE 115-a configured with an antenna panel 205 that includes one or more antenna ports 210, which may represent examples of corresponding devices described herein with reference to FIG. 1. The network entity 105-a may communicate with the UE 115-a via an uplink communication link 215 and a downlink communication link 220. The uplink communication link 215 and the downlink communication link 220 may be examples of a Uu link, a sidelink, a backhaul link, a D2D link or some other type of communication link 125 described herein with reference to FIG. 1.

In some examples of the wireless communications system 200, the UE 115-a may be within a cell 225 supported by the network entity 105-a. To be supported by the network entity 105-a, the UE 115-a may perform uplink sounding on the uplink communication link 215 by transmitting SRSs 230 via the antenna ports 210 of the antenna panel 205 at the UE 115-a. In some examples, the UE 115-a may use each antenna port 210 to transmit the SRSs 230. For example, as illustrated in FIG. 2, the antenna panel 205 at the UE 115-a may include four antenna ports 210. As such, the UE 115-a may transmit an SRS 230 via each of the four antenna ports 210 of the antenna panel 205 (e.g., the UE 115-a transmits four SRSs 230).

Further, the network entity 105-a may configure the UE 115-a with an antenna switching configuration for an uplink sounding procedure. For example, the network entity 105-a may configure the UE 115-a with a higher layer parameter (e.g., usage) in an SRS resource set (e.g., SRS-ResourceSet) that may be set to an antenna switching value (e.g., antennaSwitching). As such, the network entity 105-a may configure the UE 115-a with one of a set of antenna switching configurations (e.g., one of five antenna switching configurations). An antenna switching configuration (e.g., txry) may indicate that the UE 115-a may have y receiving antenna ports 210 within an antenna panel 205 and may be capable of transmitting x SRSs 230 at the same time to sound the y antenna ports 210, thus resulting in

antenna switches being performed by the UE 115-a to sound the y antenna ports 210.

For example, a first antenna switching configuration (e.g., t1r2) may indicate that the UE 115-a may have two receiving antenna ports 210 and the UE 115-a may transmit one SRS 230 at a time. As such, the UE 115-a may have to perform two antenna port 210 switches to sound the two receiving antenna ports 210. A second antenna switching configuration (e.g., t1r4) may indicate that the UE 115-a may have four antenna ports 210 (e.g., as illustrated via the antenna panel 205 in FIG. 2) and may transmit one SRS 230 at a time resulting in four antenna port 210 switches. A third antenna switching configuration (e.g., t2r4) may indicate that the UE 115-a may have four antenna ports 210 and may transmit two SRSs 230 at a time resulting in two antenna port 210 switches. A fourth antenna switching configuration (e.g., t1r4-t2r4) may be a combination of the second and third antenna switching configurations and may indicate that the UE 115-a may be capable of using the second antenna switching configuration or the third antenna switching configuration. As such, the network entity 105-a may determine which antenna switching configuration to configure the UE 115-a with. Further, a fifth antenna switching configuration (e.g., tr-equal) may indicate that the UE 115-a may be capable of transmitting SRSs 230 on all the receiving antenna ports 210 at the same time. For example, as illustrated in FIG. 2, the UE 115-a may have four antenna ports 210 within the antenna panel 205, thus the UE 115-a may transmit four SRS 230 at the same time via each four antenna ports 210 of the antenna panel 205 at the UE 115-a.

In some cases, the network entity 105-a may configure the UE 115-a with one of the antenna switching configurations described herein via a UE capability (e.g., a capability indicated via the capability message 235). In some examples, the network entity 105-a may configure the UE 115-a with up to two SRS 230 resource sets having different values for a higher layer parameter (e.g., resourceType) in an SRS 230 resource set configuration (e.g., SRS-Resource-Set). Further, each set may have two SRS 230 resources that the UE 115-a can transmit in different symbols where SRS 230 resource in a given set may include a single SRS 230 port. The SRS 230 port of the second resource in an SRS 230 resource set may be associated with a different UE 115-a antenna port 210 than the SRS port of the first resource in the same set. In some other examples, when the UE 115-a is configured with up to two SRS 230 resource sets, the UE 115-a may be configured such that each SRS 230 resource in a given SRS 230 resource set may include two SRS 230 ports. As such, the SRS 230 port pair of the second resource may be associated with a different UE 115-a antenna port 210 pair than the SRS 230 port pair of the first resource.

In another example, the network entity 105-a may configure the UE 115-a with zero or one SRS 230 resource set for a higher layer parameter (e.g., resourceType) in an SRS 230 resource set configuration (e.g., SRS-ResourceSet) that may be set to periodic or semi-persistent. As such, the UE 115-a may transmit four SRS 230 resources via different symbols. Further, each SRS 230 resource in a given SRS 230 resource set may include a single SRS 230 port. Therefore, the SRS 230 port of each resource may be associated with a different UE 115-a antenna port 210. In some other examples, the SRS 230 resource set configuration may be set to aperiodic with a total of four SRS 230 resources the UE 115-a can transmit via different symbols of two different slots. Further, the SRS 230 port of each SRS 230 resource in a given two sets may be associated with different UE 115-a antenna ports 210. As such, the network entity 105-a may configure the two sets two SRS 230 resources each, or a first SRS 230 resource with one SRS 230 resource and a second SRS 230 resource set with three SRS 230 resources. Moreover, the UE 115-a may expect that the two SRS 230 resource sets are both configured with the same values of higher layer parameters (e.g., alpha, p0, pathlossReferenceRS, and srs-).

However, having the UE 115-a sound all the antenna ports 210 within the antenna panel 205 at the UE 115-a may consume a relatively large quantity of SRS 230 resources within the cell 225 supported by the network entity 105-a. As such, the quantity of SRS 230 resources available for UEs 115 to use for uplink sounding with the network entity 105-a may be relatively limited. Therefore, due to the limited quantity of SRS 230 resources available within the cell 225 (e.g., SRS 230 resources from the network entity 105-a that supports the cell 225) some UEs 115 may be denied access to the cell 225. Such situations may result in a UE 115 being unsupported by a network entity 105 for a period of time thus resulting in an increase in latency and a decrease in efficiency and reliability in the wireless communications system 200. Further, based on the antenna switching capability, if the UE 115-a sounds all the antenna ports 210 of the antenna panel 205 at the UE 115-a, there may be an additional increase in latency in the wireless communications system 200 based on the latency of the uplink sounding procedure.

Therefore, the techniques of the present disclosure may introduce an SRS 230 resource saving mode in the wireless communications system 200 that enables the UE 115-a to sound a subset 240 of antenna ports 210 of all the antenna ports 210 within the antenna panel 205 at the UE 115-a. That is, the UE 115-a may sound a subset 240 of antenna ports 210 of the antenna panel 205 and refrain from sounding the remaining antenna ports 210 of the antenna panel 205. To support such techniques, the UE 115-a may transmit the capability message 235 indicating that the UE 115-a is capable of performing partial uplink sounding. In some examples, the capability message 235 may also indicate a set of antenna ports 210 within the antenna panel 205 that are available for the uplink sounding. As such, the network entity 105-a may determine which antenna ports 210 the UE 115-a should sound based on the capability message 235 from the UE 115-a. Therefore, the network entity 105-a may transmit control signaling 245 that indicates that the UE 115-a should use a subset 240 of antenna ports 210 for the uplink sounding where the subset 240 of antenna ports 210 are from the set of antenna ports 210 available for the uplink sounding indicated via the capability message 235.

Further, the network entity 105-a may indicate which antenna ports 210 the UE 115-a should use for the uplink sounding via the control signaling 245. That is, the network entity 105-a may indicate which antenna ports 210 of the set of antenna ports 210 within the antenna panel 205 may be included in the subset 240 of antenna ports 210 that the UE 115-a may use for the uplink sounding. For example, the UE 115-a may indicate that the UE 115-a is capable of partial antenna uplink sounding and that a first antenna port 210, a second antenna port 210, and a third antenna port 210 are available for uplink sounding. As such, the network entity 105-a may indicate that the UE 115-a should sound a subset 240 of antenna ports 210 (e.g., a subset 240 that includes the first antenna port 210 and the third antenna port 210) rather than sound all the antenna ports 210 of the antenna panel 205 or all the antenna ports 210 available for uplink sounding. The network entity 105-a may transmit the control signaling 245 based on receiving the capability message 235 that indicated that the antenna ports 210 available for uplink sounding and that the UE 115-a is capable of the performing partial antenna uplink sounding. As such, the UE 115-a may transmit the SRSs 230 via the subset 240 of antenna ports 210 (e.g., the first antenna port 210 and the second antenna port 210) to sound the subset 240 of antenna ports 210 while refraining from sounding the remainder of antenna ports 210 (e.g., the third antenna port 210 and a fourth antenna port 210) within the antenna panel 205 at the UE 115-a.

In some examples, the subset 240 of antenna ports 210 indicated via the control signaling 245 from the network entity 105-a may include any combination of antenna ports 210 available for the uplink sounding at the UE 115-a. For example, as illustrated within FIG. 2, there may be four antenna ports 210 available for uplink sounding and the subset 240 of antenna ports 210 to be sounded may include two antenna ports 210. However, it should be understood that the illustration of FIG. 2 is simply an example of one configuration and the subset 240 of antenna ports 210 may include different antenna ports 210, a different quantity of antenna ports 210, or both.

In some cases, as part of the capability message 235 the UE 115-a may also indicate the support for an antenna switching configuration as described herein. Additionally, or alternatively, to be capable of transmitting the capability message 235, the UE 115-a may be configured with a type of receiver (e.g., a whitening receiver). A whitening receiver may be configured to perform spectral whitening on the spectrum of signals received at the UE 115-a such that the spectrum of the signals may be more uniform. For example, since the UE 115-a may refrain from sounding all the antenna ports 210, there may be some signal leakage resulting in some interference between the antenna ports 210 of the UE 115-a. As such, the whitening receiver may mitigate the interference to prevent the leakage from causing interference that results in miscommunications between the network entity 105-a and the UE 115-a. In most examples, both older devices and newer devices (e.g., QCOM modems, UEs 115) may be equipped with a whitening receiver and thus may be capable of supporting the partial uplink sounding and capable of mitigating the interference caused by the partial uplink sounding.

In some examples, the network entity 105-a may instruct the UE 115-a to perform partial uplink sounding (e.g., use a subset 240 of antenna ports 210 for uplink sounding) via a bitmap 250 included in the control signaling 245. In some cases, the network entity 105-a may transmit the bitmap 250 to the UE 115-a semi-statically or dynamically via the control signaling 245 (e.g., an RRC message, a downlink control information (DCI) message, or a MAC-control element (MAC-CE) message). In some examples, each bit of the bitmap 250 may correspond to one of the antenna ports 210 of the antenna panel 205 at the UE 115-a. For example, as illustrated in FIG. 2, the bitmap 250 may have four bits (e.g., $b_0$, $b_1$, $b_2$, and $b_3$) which may correspond to the four antenna ports 210 within the antenna panel 205 at the UE 115-a (e.g., $b_0$ for the first antenna port, $b_1$ for the second antenna port, $b_2$ for the third antenna port, and $b_4$ for the fourth antenna port). However, it should be understood that the bitmap 250 may include more bits or fewer bits based on the quantity of antenna ports 210 within the antenna panel of a respective UE 115.

As illustrated, the first bit of the bitmap 250 (e.g., $b_0$) for the first antenna port 210 and the second bit of the bitmap 250 (e.g., $b_1$) for the second antenna port 210 (e.g., $b_0 b_1$) may represent a first pair of co-polarized antennas As such, the third bit (e.g., $b_2$) and fourth bit (e.g., $b_3$) of the bitmap 250 for the third antenna port 210 and the fourth antenna port 210 respectively (e.g., $b_2 b_3$) may represent a second pair of co-polarized antennas. Further, $b_0$ and $b_2$ (e.g., $b_0 b_2$) may represent a first pair of cross-polarized antennas and $b_1$ and $b_3$ (e.g., $b_1 b_3$) may represent a second pair of cross-polarized antennas. Co-polarized antennas may be configured such that a first antenna is parallel with a second antenna and cross polarization may be configured such that the first antenna is perpendicular to the second antenna (e.g., forming a '+' or an 'x').

In some cases, when the UE 115-a sounds a subset 240 of the antenna ports 210 there may be a relatively small SNR or channel to interference noise ratio (CINR) increase compared to when the UE 115-a sounds all the antenna ports 210. For example, the network entity 105-a may configure a first UE 115 and a second UE 115 with a modulation and coding scheme (MCS) of with an index of 20 on an MCS table (e.g., the MCS table dictating the modulation order, coding rate, and spectral efficiency of a corresponding MCS index) and two downlink receiving layers. Further, there may be a clustered delay line (CDL) type C (CDL-C) of 100 nanoseconds (ns) for the first UE 115 and the second UE 115. In some cases, the first UE 115 may sound a subset 240 of the antenna ports 210 and the second UE 115 may sound all the antenna ports 210. In such cases, there may be a relatively small difference in the noise ratio when the CINR is comparted to the block error rate (BLER). For example, the noise ratio of the second UE 115 (e.g., the UE 115 that sounded all the antenna ports 210) may be less than that of the first UE 115 (e.g., the UE 115 that sounded the subset 240 of the antenna ports 210).

However, when using the same parameters (e.g., MCS, quantity of downlink layers) such difference in noise ratio (e.g., SINR, CINR, or both) may be negligible when compared to the quantity of SRS resources saves when a UE 115 (e.g., the UE 115-a) uses partial antenna port 210 sounding. For example, the network entity 105-a may configure the UE 115-a to sound two out of four antenna ports 210 and the UE 115-a may consume two SRS 230 resources per antenna port 210 sounded, resulting in the UE 115-a saving a total of four SRS 230 resources. In some other cases, the network entity 105-a may configure the UE 115-a to sound one out of the four antenna ports 21 and the UE 115-a may save a total six SRS 230 resources. As such, by refraining from sounding all the antenna ports 210, the UE 115-a may have some SRS 230 resource savings which may outweigh the relatively slight noise ratio increase caused by using partial antenna port 210 sounding.

When a UE 115-a is capable of the performing the partial antenna port 210 sounding, the UE 115-a may transmit a capability message 235 to the network entity 105-a indicating that the UE 115-a may be capable of performing partial antenna port 210 sounding. Further, the capability message 235 may also indicate all the antenna ports 210 of the antenna panel 205 may be used for uplink sounding (e.g., the quantity of antenna ports 210 available for the uplink sounding). In some examples, capability message 235 may indicate that the UE 115-a may be capable of performing the partial antenna port 210 sounding and that all four antenna ports 210 may be available for the uplink sounding. Following, the network entity 105-a may transmit some control signaling 245 (e.g., an RRC message, DCI message, or MAC-CE message) and indicate for the UE 115-a to sound all the antenna ports 210 available at the UE 115-a for the uplink sounding. In some cases, the signaling 245 may include the bitmap 250, as described herein, where each bit of the bitmap 250 may be associated with a corresponding antenna port 210 and the bitmap 250 may indicate that each antenna port 210 should be used for the uplink sounding. As such, the UE 115-a may begin uplink sounding using all four antenna ports 210 of the antenna panel 205 at the UE 115-a by transmitting a SRSs 230 to the network entity 105-a via each antenna port.

In some cases, before or during the uplink sounding procedure, the network entity 105-a may transmit a second control signaling 245 with a second bitmap 250 indicating for the UE 115-a to sound a subset 240 of the antenna ports 210 available for the uplink sounding instead of sounding all the antenna ports 210. For example, the second bitmap 250 may indicate for the UE 115-a to sound the first and third antenna port 210 and refrain from sounding the second and fourth antenna ports 210 to save SRS 230 resources. To indicate that the UE 115-*a* should refrain from sounding a respective antenna port 210 (e.g., the second and fourth antenna port 210) the network entity 105-*a* may null the respective bits of the bitmap 250. That is, the bits of the bitmap 250 that are nulled (e.g., are empty, equal to zero, or equal to a null value) may be indicative of the antenna ports 210 not sounded by the UE 115-*a* and the remaining bits of the bitmap 250 (e.g., the bits with a value of one or the bits that have a value) may be indicative of the antenna ports 210 to be sounded by the UE 115-*a*.

In some examples, the change in which antenna ports 210 the UE 115-*a* may use for the uplink sounding may be considered a reconfiguration. Thus, the second control signaling 245 described herein may be considered a reconfiguration message. In some cases, the network entity 105-*a* may transmit the second signaling 245 to reconfigure the UE 115-*a* based on the channel quality of the uplink communication link 215 or the estimated channel quality of the downlink communication link 220 which may be based on the channel quality of the uplink communication link 215 as described herein. Further, the network entity 105-*a* may transmit the second signaling 245 based on a change in a quantity of UEs 115 within the cell 225 supported by the network entity 105-*a*, a change in the UE 115-*a* capability, or any combination thereof.

In some cases, the reconfiguration of which antenna ports 210 the UE 115-*a* uses for uplink sounding may be based on a change in the capability of the UE 115-*a*. For example, after a period of time the UE 115-*a* may transition to using a portion of the antenna ports 210 for communications on different RATs. As such, if the UE 115-*a* previously indicated that all the antenna ports 210 of the antenna panel 205 at the UE 115-*a* were available for uplink sounding, the UE 115-*a* may transmit a second capability message 235 indicating a change in the capability of the UE 115-*a*. In some examples, the second capability message 235 may indicate the change in capability compared to the previous capability message 235. That is, to save resources and time, the UE 115-*a* may indicate which antenna ports 210 availability has changed.

For example, if the availability of the fourth antenna port 210 of the antenna panel 205 has changed and the availability of the other antenna ports 210 remain unchanged, the UE 115-*a* may indicate a change to the availability of the fourth antenna port 210 within the second capability message 235. As such, by refraining from including all the antenna ports 210 within the second capability message 235 the UE 115-*a* may reduce the signaling overhead of transmitting the second capability message 235. In some other examples, when there is a change in availability of the antenna ports 210 for the uplink sounding, the UE 115-*a* may transmit an indication of each antenna ports 210 availability regardless of whether the availability of a respective antenna port 210 has changed. Additionally, or alternatively, the availability of the antenna ports 210 for the uplink sounding may change such that an antenna port 210 previously unavailable to be sounded may be available to be sounded by the UE 115-*a*. Further, in some cases, the UE 115-*a* may transmit the change in antenna port 210 availability via the second capability message 235 as an uplink control information (UCI) message.

In some examples, after the network entity 105-*a* receives the capability message 235 from the UE 115-*a* indicating that all the antenna ports 210 of the antenna panel 205 may be available for uplink sounding, the network entity 105-*a* may transmit the control signaling 245 indicating that the UE 115-*a* should sound a subset 240 of the antenna ports 210 available for the uplink sounding. In some cases, the network entity 105-*a* may select that the UE 115-*a* should sound two cross polarized antenna ports 210 and may determine that the remaining two antenna ports 210 may be used for multi-user interference (MUI) cancellation. That is, since the UE 115-*a* may be scheduled under MU-MIMO with up to two serving layers (e.g., two downlink receiving layers), the UE 115-*a* may use two of the four antenna ports 210 to receive downlink transmissions from the network entity 105-*a*. As such, in some cases, the network entity 105-*a* may configure the UE 115-*a* to use the remaining antenna ports 210 (e.g., the unsounded antenna ports 210) for MUI cancellation to remove unwanted or undesired signals.

In some other examples, the initial capability message 235 from the UE 115-*a* may indicate that the UE 115-*a* may be capable of performing the performing the partial antenna port 210 sounding and that a portion (e.g., a subset) of the antenna ports 210 within the antenna panel 205 may be available for the uplink sounding. In some cases, the subset 240 of antenna ports 210 indicated via the capability message 235 may be two cross polarized antenna ports 210 and the UE 115-*a* may use the remaining antenna ports for other signaling or radio access technologies (e.g., RATs). As such, the network entity 105-*a* may transmit the control signaling 245 to indicate that the UE 115-*a* should use the subset 240 of antenna ports 210 indicated via the capability message 235 (e.g., the two cross polarized antenna ports 210). Additionally, or alternatively, as the UE 115-*a* may be using the other antenna ports 210 (e.g., the unsounded antenna ports 210) for other wireless communications, the UE 115-*a* may be unable to use the unsounded antenna ports 210 for MUI cancellation. Therefore, the network entity 105-*a* may be unable to configure the unsounded antenna ports 210 for MUI cancellation. As such, the network entity 105-*a* may be capable of scheduling the UE 115-*a* under single user (SU) MIMO (SU-MIMO) with two downlink layers or under MU-MIMO with one downlink layer.

In some examples, when the network entity 105-*a* schedules the UE 115-*a* with the subset 240 of antenna ports 210 via the bitmap 250, the order of the bits within the bitmap 250 may impact the performance of the UE 115-*a*. For example, the UE 115-*a* may be capable of performing uplink sounding with each antenna ports 210 (e.g., four antenna ports 210) and the network entity 105-*a* may transmit the bitmap 250 via the control signaling 245 to indicate the subset 240 of antenna ports 210 the UE 115-*a* should use for the uplink sounding. In some cases, the network entity 105-*a* may indicate via the bitmap 250 that the UE 115-*a* should use two out of the four available antenna ports 210 for the uplink sounding. For example, while the network entity 105-*a* and the UE 115-*a* has a strong line of sight (LOS) channel (e.g., the uplink communication link 215, the downlink communication link 220, or both), the bitmap 250 may be indicate for the UE 115-*a* to use a pair of co-polarized antenna ports 210 or a pair of cross-polarized antenna ports 210. For example, in some cases, the network entity 105-*a* may transmit the bitmap 250 with a value of [1010], the UE 115-*a* may use the first antenna port 210 and the third antenna port 210 (e.g., cross-polarized antenna ports 210) of the antenna panel 205 to transmit the SRSs 230 for the uplink sounding. In some other cases, the network entity 105-*a* may transmit the bitmap 250 with a value of [1100], the UE 115-*a* may use the first antenna port 210 and the second antenna port 210 of the antenna panel 205 (e.g., co-polarized antenna ports 210) to transmit the SRSs 230 for the uplink sounding.

In some examples, when the UE 115-a uses cross-polarized antenna ports 210 rather than co-polarized antenna ports 210, the UE 115-a may be capable of providing reduced interference for received signals via signal decorrelation and be capable of managing a relatively higher signal density. As such, a CINR value of using cross-polarized antenna ports 210 may be relatively lower than the CINR value of the UE 115-a using co-polarized antenna ports 210. Therefore, when the network entity 105-a is capable of choosing between antenna ports 210 to include within the subset 240 of antenna ports 210, the order in which the antenna ports are indicated via the bitmap 250 or which antenna ports are indicated to be used by the UE 115-a via the bitmap 250 may impact the performance of the wireless communications system 200.

As such, the techniques of the present disclosure may provide for enhanced communications within the wireless communications system 200. For example, the techniques described herein may allow the network entity 105-a to increase the throughput of the cell 225 by connecting with additional UEs 115 as additional SRS 230 resources may become available by having UEs 115 use a subset 240 of antenna ports 210 for uplink sounding. Further, there may be relatively minimal impact to the UE 115 peak throughput for UEs 115 sounding a subset 240 of antenna ports 210 of a respective antenna panel 205 compared to UEs 115 sounding all the antenna ports 210 of a respective antenna panel 205. Additionally, or alternatively, UEs 115 (e.g., the UE 115-a) may experience an increase in power savings due to a reduction in transmission power due to refraining from transmitting SRS 230 from each antenna port 210 of an antenna panel 205. Moreover, there may also be a decrease in the timespan of the sounding procedures for UEs 115, thus resulting in a reduction in the channel gaining for MU-MIMO.

In some examples, UEs 115 with reduced capabilities may also benefit from the techniques of the present disclosure. For example, a UE 115 (e.g., the UE 115-a) may be unable to support SRS 230 antenna switching as described herein, the UE 115-a may indicate via a capability message 235 that a single antenna port is available to be sounded for uplink sounding. In some cases, such indication may be indicated via a bitmap with the capability message 235 with a single non-zero bit. As such, the network entity 105-a may configure the UE 115-a to sound the single transmission antenna port 210 such that the network entity 105-a may configure the UE 115-a with one downlink layer. Therefore, in cases where the UE 115-a may be incapable of sounding all the antenna ports 210 of the antenna panel 205, the network entity 105-a may be capable of configuring the UE 115-a with at least one downlink layer such that the network entity 105-a and the UE 115-a may communicate via the uplink communication link 215 and the downlink communication link 220.

In some other examples, the UE 115-a may be configured with some additional capabilities which can be enhanced by the techniques of the present disclosure. For example, in some cases, the UE 115-a may be configured with multiple subscriber identity modules (SIM) (e.g., dual SIMs). As such, by using partial antenna port 210 uplink sounding, the UE 115-a may be capable of communicating with multiple RATs. That is, the UE 115-a may use a first subset 240 of antenna ports 210 for communication with a first RAT and a second subset 240 of antenna ports 210 for communication with a second RAT. In some other cases, the UE 115-a may be configured with an antenna panel 205 that includes additional antenna ports 210 (e.g., eight antenna ports 210). In some examples, the additional antenna ports 210 may be provided via the antenna panel 205 of the UE 115-a. In some other examples, the additional antenna ports 210 may be provided by a separate antenna panel 205 within the UE 115-a or a different UE 115 that is used in conjunction with the antenna panel 205 of the UE 115-a to form a virtual antenna panel 205. Regardless, rather than the network entity 105-a configuring the UE 115-a with additional antenna port 210 switching capabilities, the UE 115-a may use a subset 240 of antenna ports 210 for uplink sounding such that the UE 115-a is capable of using the existing antenna port 210 switching modes described elsewhere herein (e.g., t1r4, t2r4, t1r4-t2r4, tr-equal).

As such, the techniques of the present disclosure may provide for enhanced communications within the wireless communications system 200 regardless of the network entity 105 refraining from configuring UEs 115 with a full rank and the relatively small SNR loss resulted from the partial antenna port 210 uplink sounding. Further descriptions of the techniques of the present disclosure and the improved communications of the wireless communications system 200 by providing the partial antenna port 210 uplink sounding may be described elsewhere herein including with reference to FIG. 3.

Figure 3:
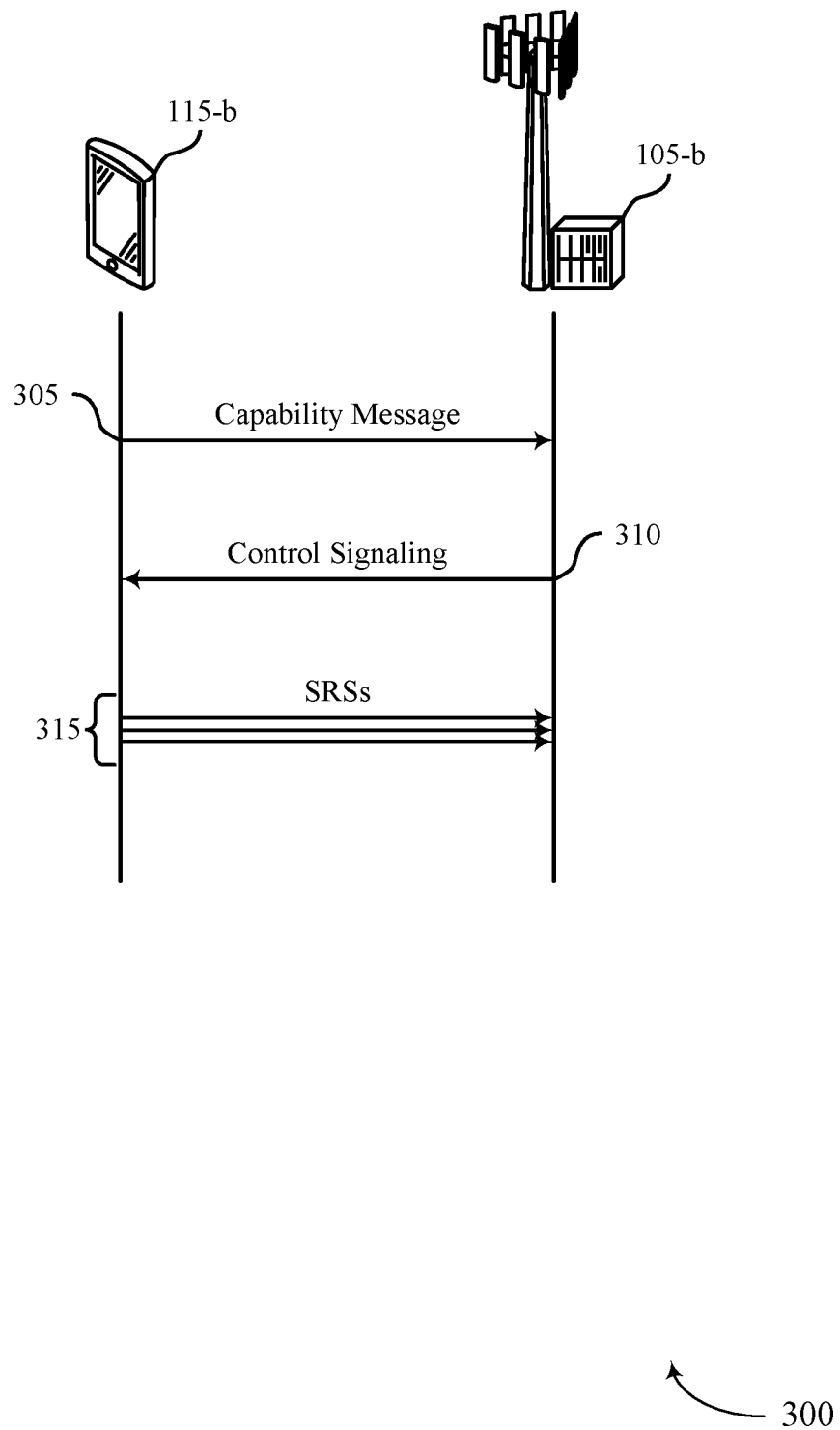
FIG. 3 shows an example of a process flow that supports partial antenna uplink sounding in accordance with one or more aspects of the present disclosure.

FIG. 3 shows an example of a process flow 300 that supports partial antenna uplink sounding in accordance with one or more aspects of the present disclosure. In some examples, the process flow 300 may implement or be implemented by the wireless communications system 100 and/or the wireless communications system 200. For example, the process flow 300 may include a UE 115-b and a network entity 105-b, which may be examples of devices described herein with reference to FIG. 1.

In the following description of the process flow 300, the operations between the UE 115-b and the network entity 105-b may be performed in different orders or at different times. Some operations may also be left out of the process flow 300, or other operations may be added. Although the UE 115-b and the network entity 105-b are shown performing the operations of the process flow 300, some aspects of some operations may also be performed by one or more other wireless devices.

At 305, the UE 115-b may transmit, to the network entity 105-b, a first capability message that indicates that the UE 115-b may be capable of using a subset of antenna ports of a set of antenna ports at the UE 115-b for uplink sounding on a wireless band. Further, one or more antenna ports of the set of antenna ports may be indicated by the UE 115-b as being available for the uplink sounding and the first capability message may include an indication of the set of antenna ports. In some cases, the set of antenna ports indicated by the first capability message may be a subset of antenna ports of a set of antenna ports configured at the UE 115-b. In some other cases, the UE 115-b may transmit the first capability message, to the network entity 105-b, indicating that the UE 115-b is capable of using the one or more antenna ports of the set of antenna ports for the uplink sounding based on the one or more antenna ports of the set of antenna ports indicated via the first capability message being available for the uplink sounding. Additionally, or alternatively, the UE 115-b may transmit the first capability message based on a type of receiver associated with the set of antenna ports at the UE 115-b that are available for the uplink sounding.

At 310, the UE 115-*b* may receive, from the network entity 105-*b*, control signaling indicating the subset of antenna ports of the set of antenna ports that the UE 115-*b* is to use for the uplink sounding. Further, the network entity 105-*b* may transmit, to the UE 115-*b*, the control signaling based on the first capability message from the UE 115-*b*. In some examples, the UE 115-*b* may receive, from the network entity 105-*b*, a bitmap that includes the control signaling where each bit of the bitmap is associated with a respective antenna port of the set of antenna ports. As such, the control signaling may indicate the subset of antenna ports that the UE 115-*b* is to use for the uplink sounding based on a respective value of each bit of the bitmap. In some cases, the bitmap may indicate the UE 115-*b* should refrain from using a respective antenna port of the set of antenna ports for the uplink sounding based on the respective value of a bit of the bitmap that is associated with the respective antenna port being a null value. Further, the UE 115-*b* may receive, from the network entity 105-*b*, the bitmap via a DCI message, an RRC message, a MAC-CE message, or any combination thereof. Additionally, or alternatively, the subset of antenna ports indicated by the control signaling may be the same as the set of antenna ports indicated by the first capability message as being available for the uplink sounding.

In some other examples, the UE 115-*b* may receive, from the network entity 105-*b*, a first control signaling (which may be referred to as a second control signaling elsewhere herein) indicating the UE 115-*b* is to use each antenna port of the one or more antenna ports of the set of antenna ports indicated via the first capability message for the uplink sounding. Further, the UE 115-*b* may receive, from the network entity 105-*b*, a second control signaling (which may be referred to as the control signaling elsewhere herein) indicating that the subset of antenna ports that the UE 115-*b* is to use for the uplink sounding. The second control signaling may be based on the first capability message and received after the first control signaling. In some cases, the second control signaling may indicate that the UE 115-*b* is to use the subset of antenna ports for the uplink sounding based on a transmission power level of a respective one or more antenna ports of the set of antenna ports satisfying a transmission power level threshold.

Additionally, or alternatively, before or after the network entity 105-*b* transmits the control signaling, the UE 115-*b* may transmit, to the network entity 105-*b* a second capability message that indicates a second set of antenna ports at the UE 115-*b*. In some cases, one or more antenna ports of the second set of antenna ports may be available for the uplink sounding where the second set of antenna ports is different from the set of antenna ports indicated via the first capability message. As such, the UE 115-*b* may receive, from the network entity 105-*b*, a second control signaling indicating the subset of antenna ports of the second set of antenna ports that the UE 115-*b* is to use for the uplink sounding. In some cases, second control signaling may be based on the second capability message.

At 315, the UE 115-*b* may transmit, to the network entity 105-*b*, one or more SRSs via the subset of antenna ports indicated by the control signaling as part of the uplink sounding on the wireless band. In some cases, the UE 115-*b* may transmit the one or more SRSs to the network entity 105-*b* via the subset of antenna ports indicated by the second control signaling that the UE 115-*b* receives based on the second capability message from the UE 115-*b*. Further, the UE 115-*b* may transmit, to the network entity 105-*b*, the one or more SRSs via one or more SRS resources.

Figure 4:
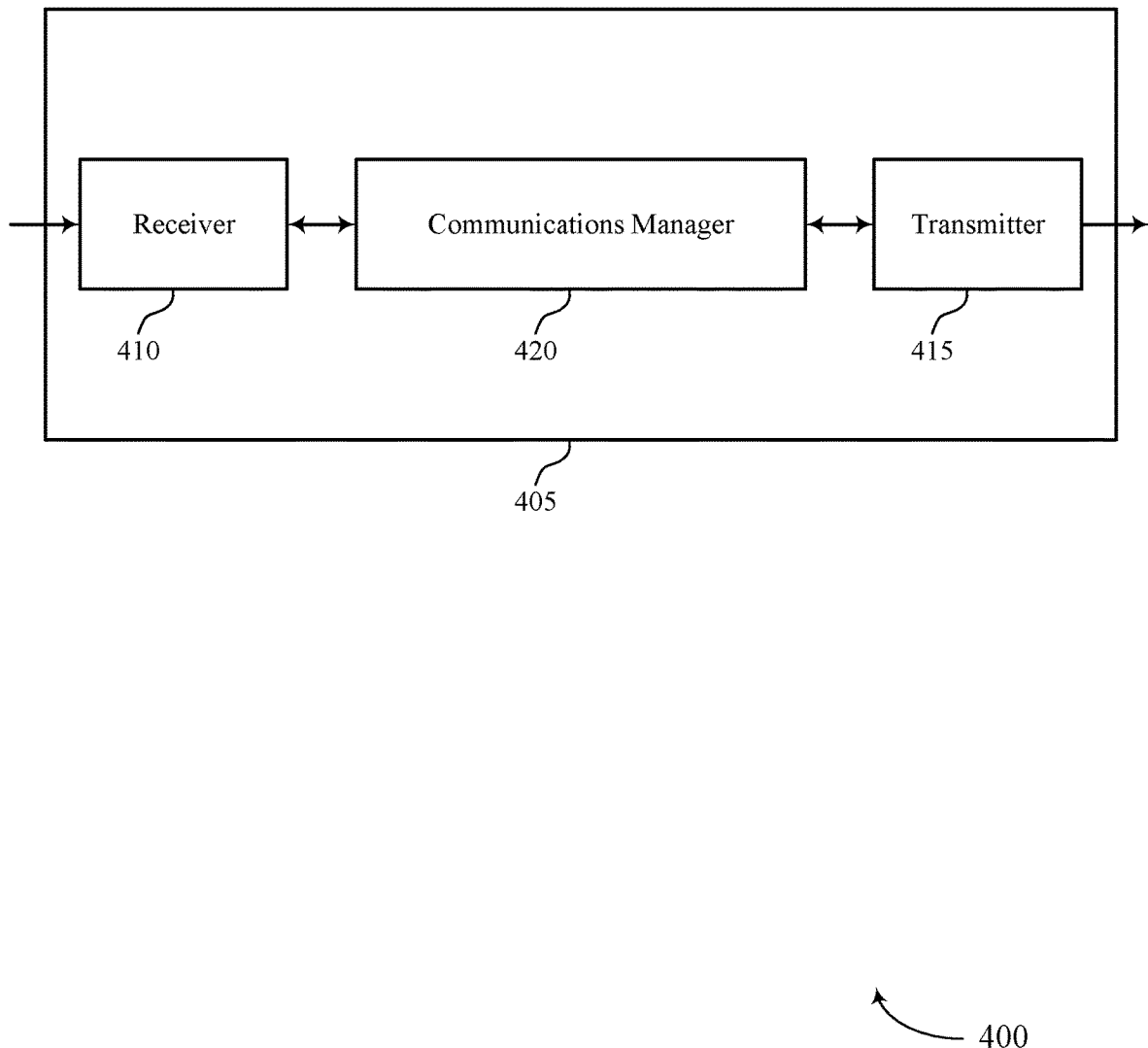
FIGS. 4 and 5 show block diagrams of devices that support partial antenna uplink sounding in accordance with one or more aspects of the present disclosure.

FIG. 4 shows a block diagram 400 of a device 405 that supports partial antenna uplink sounding in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to partial antenna uplink sounding). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to partial antenna uplink sounding). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of partial antenna uplink sounding as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor. If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for transmitting, to a network entity, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports. The communications manager 420 is capable of, configured to, or operable to support a means for receiving, from the network entity, control signaling indicating the subset of antenna ports of the set of multiple antenna ports that the UE is to use for the uplink sounding, the control signaling being based on the first capability message. The communications manager 420 is capable of, configured to, or operable to support a means for transmitting, to the network entity, one or more SRSs via the subset of antenna ports indicated by the control signaling as part of the uplink sounding on the wireless band.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for a UE 115 sounding a subset of antenna ports to support reduced power consumption and a more efficient utilization of communication resources.

Figure 5:
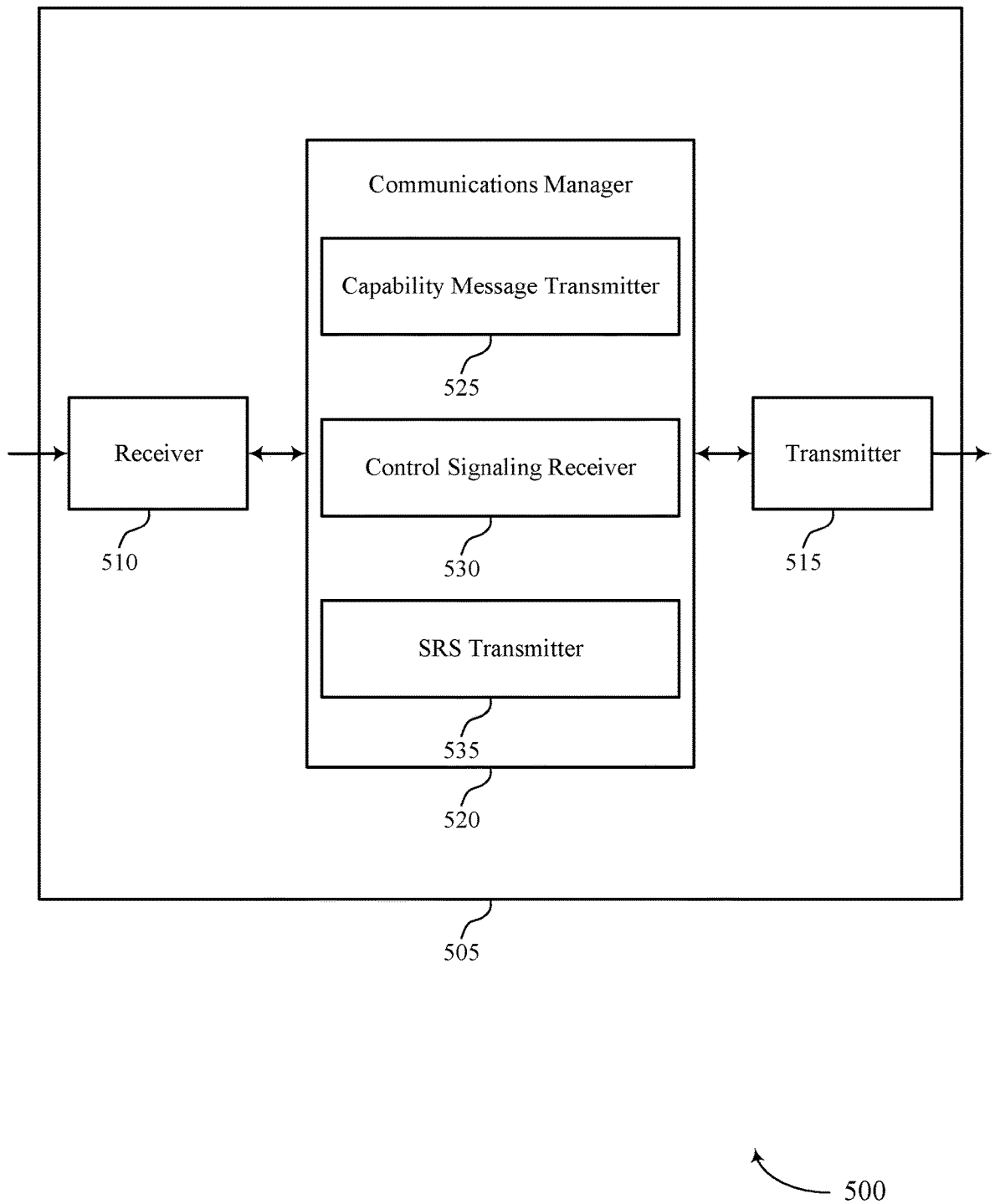

FIG. 5 shows a block diagram 500 of a device 505 that supports partial antenna uplink sounding in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to partial antenna uplink sounding). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to partial antenna uplink sounding). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of partial antenna uplink sounding as described herein. For example, the communications manager 520 may include a capability message transmitter 525, a control signaling receiver 530, an SRS transmitter 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The capability message transmitter 525 is capable of, configured to, or operable to support a means for transmitting, to a network entity, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports. The control signaling receiver 530 is capable of, configured to, or operable to support a means for receiving, from the network entity, control signaling indicating the subset of antenna ports of the set of multiple antenna ports that the UE is to use for the uplink sounding, the control signaling being based on the first capability message. The SRS transmitter 535 is capable of, configured to, or operable to support a means for transmitting, to the network entity, one or more SRSs via the subset of antenna ports indicated by the control signaling as part of the uplink sounding on the wireless band.

Figure 6:
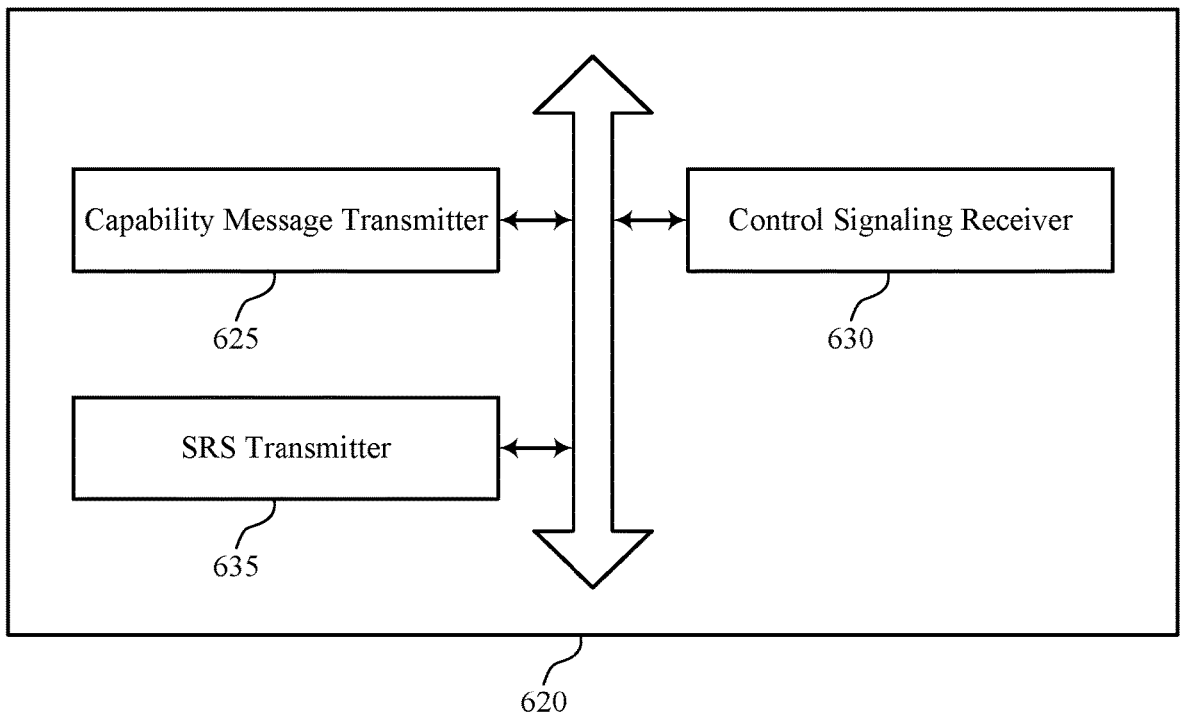
FIG. 6 shows a block diagram of a communications manager that supports partial antenna uplink sounding in accordance with one or more aspects of the present disclosure.

FIG. 6 shows a block diagram 600 of a communications manager 620 that supports partial antenna uplink sounding in accordance with one or more aspects of the present disclosure. The communications manager 620 may be an example of aspects of a communications manager 420, a communications manager 520, or both, as described herein. The communications manager 620, or various components thereof, may be an example of means for performing various aspects of partial antenna uplink sounding as described herein. For example, the communications manager 620 may include a capability message transmitter 625, a control signaling receiver 630, an SRS transmitter 635, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The capability message transmitter 625 is capable of, configured to, or operable to support a means for transmitting, to a network entity, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports. The control signaling receiver 630 is capable of, configured to, or operable to support a means for receiving, from the network entity, control signaling indicating the subset of antenna ports of the set of multiple antenna ports that the UE is to use for the uplink sounding, the control signaling being based on the first capability message. The SRS transmitter 635 is capable of, configured to, or operable to support a means for transmitting, to the network entity, one or more SRSs via the subset of antenna ports indicated by the control signaling as part of the uplink sounding on the wireless band.

In some examples, the capability message transmitter 625 is capable of, configured to, or operable to support a means for transmitting, to the network entity, a second capability message including an indication of a second set of multiple antenna ports at the UE, one or more antenna ports of the second set of multiple antenna ports being available for the uplink sounding, where the second set of multiple antenna ports being different from the set of multiple antenna ports. In some examples, the control signaling receiver 630 is capable of, configured to, or operable to support a means for receiving, from the network entity, a second control signaling indicating the subset of antenna ports of the second set of multiple antenna ports that the UE is to use for the uplink sounding, the second control signaling being based on the second capability message, where the one or more SRSs are transmitted via the subset of antenna ports indicated by the second control signaling.

In some examples, to support receiving the control signaling, the control signaling receiver 630 is capable of, configured to, or operable to support a means for receiving, from the network entity, a bitmap including the control signaling, each bit of the bitmap being associated with a respective antenna port of the set of multiple antenna ports, where the control signaling indicates the subset of antenna ports that the UE is to use for the uplink sounding based on a respective value of each bit of the bitmap.

In some examples, the bitmap indicates that the UE should refrain from using a respective antenna port of the set of multiple antenna ports for the uplink sounding based on the respective value of a bit of the bitmap that is associated with the respective antenna port being a null value.

In some examples, the bitmap is received via a DCI message, an RRC message, a MAC-CE message, or any combination thereof.

In some examples, to support transmitting the first capability message, the capability message transmitter 625 is capable of, configured to, or operable to support a means for transmitting, to the network entity, the first capability message including the indication of the set of multiple antenna ports at the UE, the set of multiple antenna ports being a subset of a plurality antenna ports configured at the UE, where the subset of antenna ports indicated by the control signaling is the same as the set of multiple antenna ports indicated by the first capability message.

In some examples, the capability message transmitter 625 is capable of, configured to, or operable to support a means for transmitting, to the network entity, the first capability message that indicates that the UE is capable of using a subset of antenna ports of the set of multiple antenna ports for the uplink sounding and indicates that the UE is capable of using the one or more antenna ports of the set of multiple antenna ports for the uplink sounding based on the one or more antenna ports of the set of multiple antenna ports being available for the uplink sounding. In some examples, the control signaling receiver 630 is capable of, configured to, or operable to support a means for receiving, from the network entity, a second control signaling indicating that the UE is to use the one or more antenna ports of the set of multiple antenna ports for the uplink sounding. In some examples, the control signaling receiver 630 is capable of, configured to, or operable to support a means for receiving, from the network entity, the control signaling indicating the subset of antenna ports that the UE is to use for the uplink sounding, the control signaling being based on the first capability message, where the control signaling is received after the second control signaling and indicates that the UE is to use the subset of antenna ports for the uplink sounding based on a transmission power level of a respective one or more antenna ports of the set of multiple antenna ports satisfying a transmission power level threshold.

In some examples, to support transmitting the one or more SRSs, the SRS transmitter 635 is capable of, configured to, or operable to support a means for transmitting, to the network entity, the one or more SRSs via one or more SRS resources.

In some examples, transmitting the first capability message is based on a type of receiver associated with the set of multiple antenna ports at the UE that are available for the uplink sounding.

Figure 7:
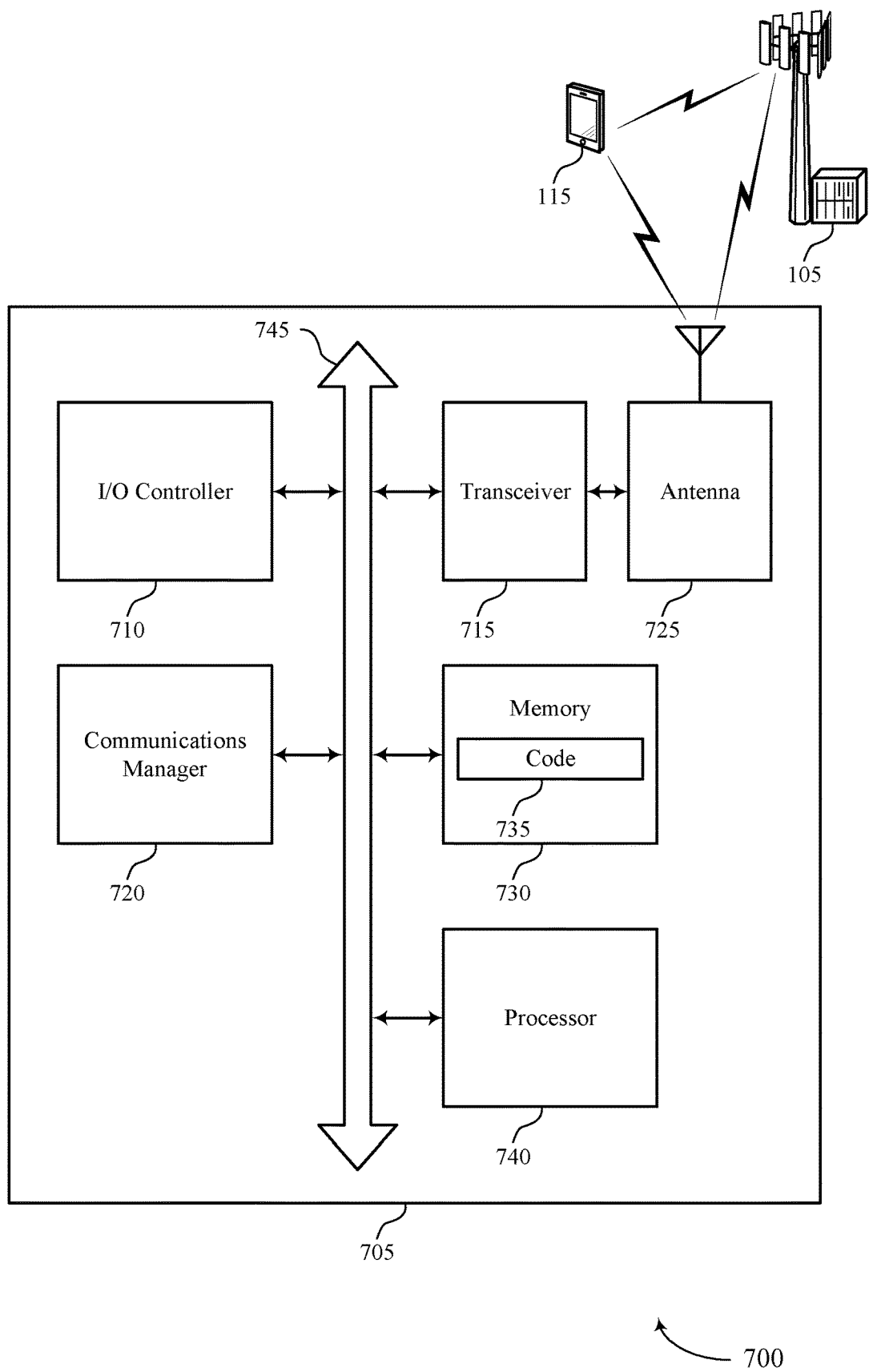
FIG. 7 shows a diagram of a system including a device that supports partial antenna uplink sounding in accordance with one or more aspects of the present disclosure.

FIG. 7 shows a diagram of a system 700 including a device 705 that supports partial antenna uplink sounding in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting partial antenna uplink sounding). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. As such, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for transmitting, to a network entity, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports. The communications manager 720 is capable of, configured to, or operable to support a means for receiving, from the network entity, control signaling indicating the subset of antenna ports of the set of multiple antenna ports that the UE is to use for the uplink sounding, the control signaling being based on the first capability message. The communications manager 720 is capable of, configured to, or operable to support a means for transmitting, to the network entity, one or more SRSs via the subset of antenna ports indicated by the control signaling as part of the uplink sounding on the wireless band.

By including or configuring the communications manager 720 in accordance with examples as described herein, the device 705 may support techniques for a UE 115 sounding a subset of antenna ports to support improved communication reliability, reduced latency, improved user experience related to reduced latency, reduced power consumption, and more efficient utilization of communication resources.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of partial antenna uplink sounding as described herein, or the at least one processor 740 and the at least one memory 730 may be otherwise configured to, individually or collectively, perform or support such operations.

Figure 8:
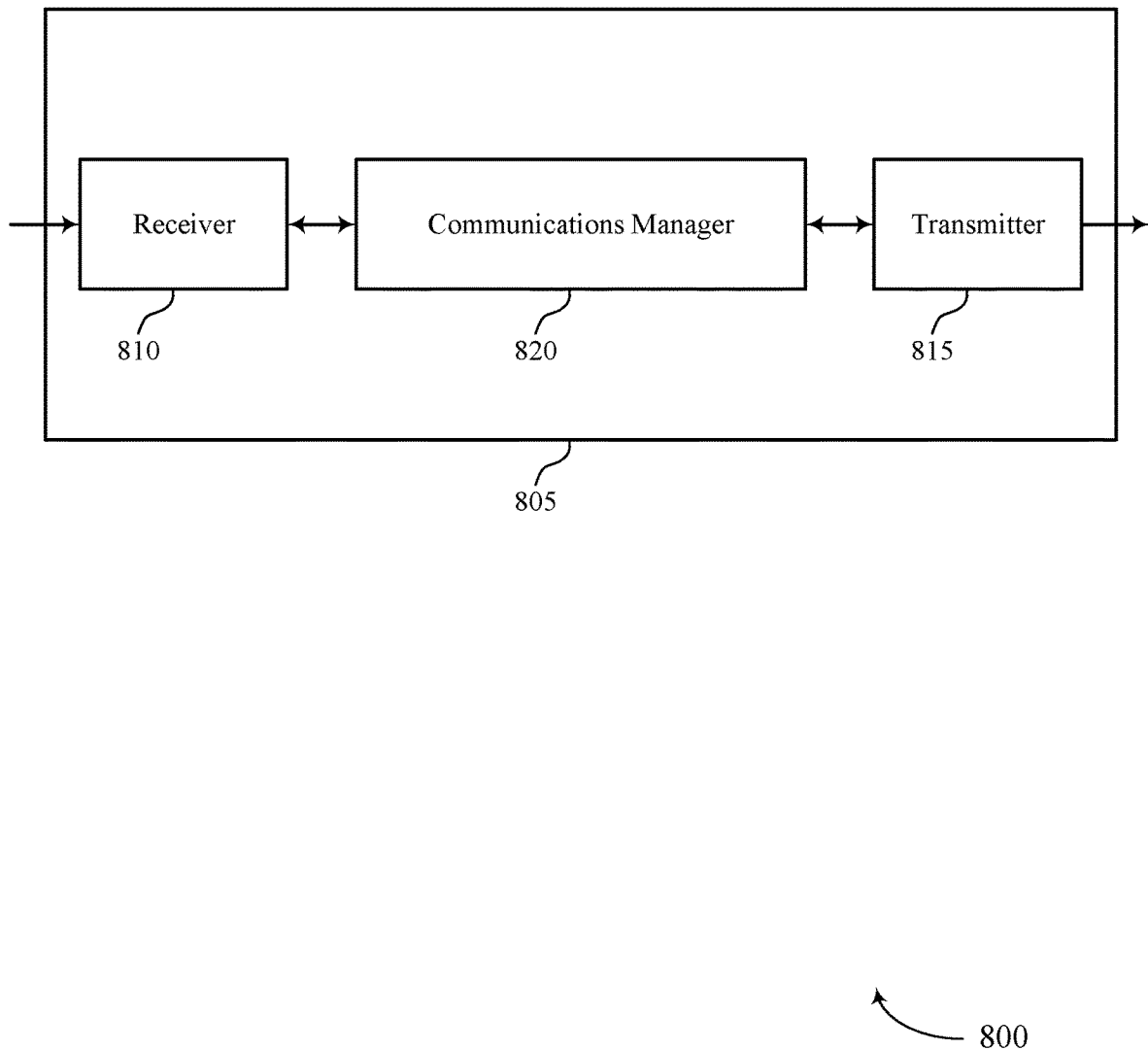
FIGS. 8 and 9 show block diagrams of devices that support partial antenna uplink sounding in accordance with one or more aspects of the present disclosure.

FIG. 8 shows a block diagram 800 of a device 805 that supports partial antenna uplink sounding in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of partial antenna uplink sounding as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for receiving, from a UE, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports. The communications manager 820 is capable of, configured to, or operable to support a means for transmitting, to the UE, control signaling indicating the subset of antenna ports of the set of multiple antenna ports that the UE is to use for the uplink sounding, the control signaling being based on the first capability message. The communications manager 820 is capable of, configured to, or operable to support a means for receiving, from the UE, one or more SRSs via the subset of antenna ports indicated by the control signaling as part of the uplink sounding on the wireless band.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for a UE 115 sounding a subset of antenna ports to support reduced power consumption and a more efficient utilization of communication resources.

Figure 9:
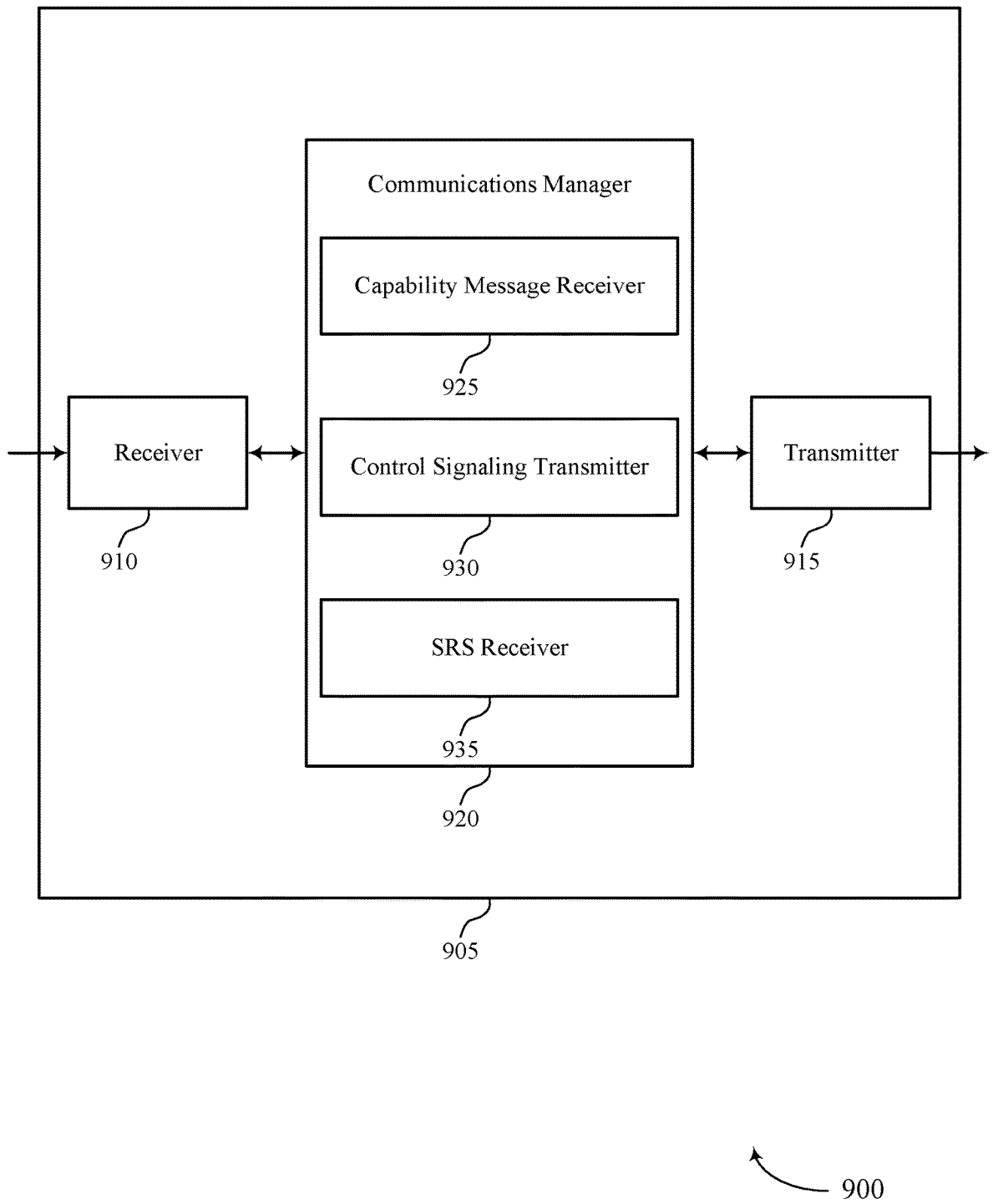

FIG. 9 shows a block diagram 900 of a device 905 that supports partial antenna uplink sounding in accordance with one or more aspects of the present disclosure. The device 905 may be an example of aspects of a device 805 or a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of partial antenna uplink sounding as described herein. For example, the communications manager 920 may include a capability message receiver 925, a control signaling transmitter 930, an SRS receiver 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The capability message receiver 925 is capable of, configured to, or operable to support a means for receiving, from a UE, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports. The control signaling transmitter 930 is capable of, configured to, or operable to support a means for transmitting, to the UE, control signaling indicating the subset of antenna ports of the set of multiple antenna ports that the UE is to use for the uplink sounding, the control signaling being based on the first capability message. The SRS receiver 935 is capable of, configured to, or operable to support a means for receiving, from the UE, one or more SRSs via the subset of antenna ports indicated by the control signaling as part of the uplink sounding on the wireless band.

Figure 10:
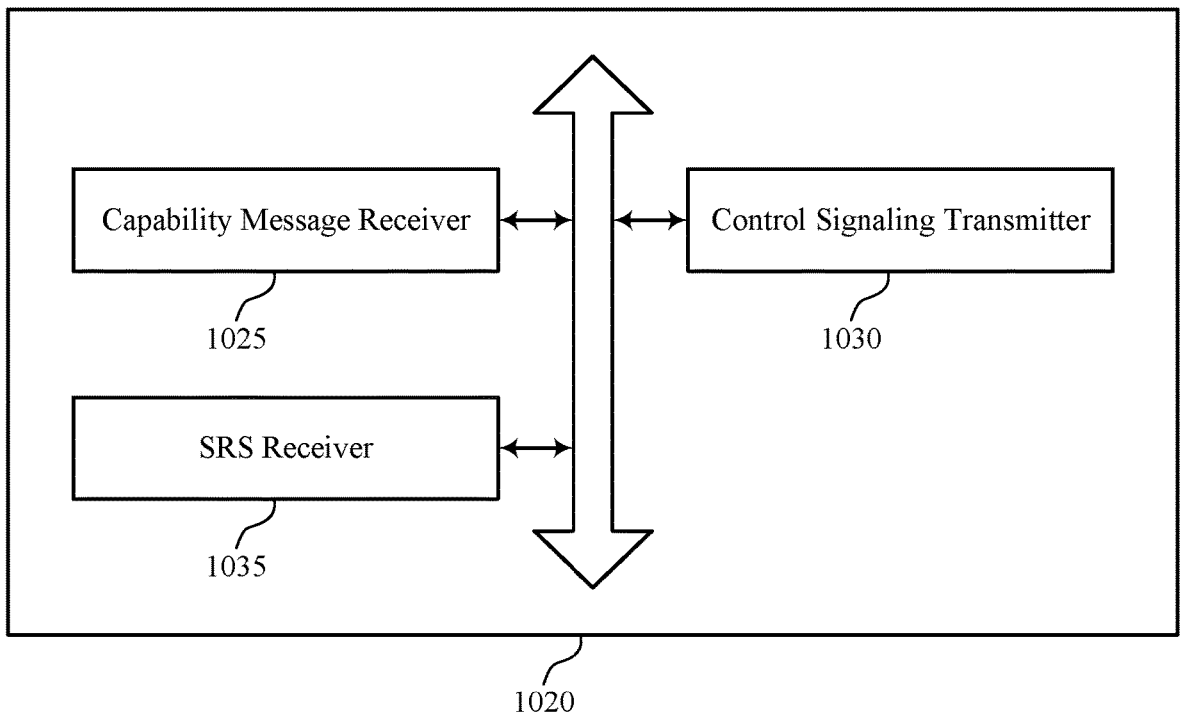
FIG. 10 shows a block diagram of a communications manager that supports partial antenna uplink sounding in accordance with one or more aspects of the present disclosure.

FIG. 10 shows a block diagram 1000 of a communications manager 1020 that supports partial antenna uplink sounding in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of partial antenna uplink sounding as described herein. For example, the communications manager 1020 may include a capability message receiver 1025, a control signaling transmitter 1030, an SRS receiver 1035, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The capability message receiver 1025 is capable of, configured to, or operable to support a means for receiving, from a UE, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports. The control signaling transmitter 1030 is capable of, configured to, or operable to support a means for transmitting, to the UE, control signaling indicating the subset of antenna ports of the set of multiple antenna ports that the UE is to use for the uplink sounding, the control signaling being based on the first capability message. The SRS receiver 1035 is capable of, configured to, or operable to support a means for receiving, from the UE, one or more SRSs via the subset of antenna ports indicated by the control signaling as part of the uplink sounding on the wireless band.

In some examples, the capability message receiver 1025 is capable of, configured to, or operable to support a means for receiving, from the UE, a second capability message including an indication of a second set of multiple antenna ports at the UE, one or more antenna ports of the second set of multiple antenna ports being available for the uplink sounding, where the second set of multiple antenna ports being different from the set of multiple antenna ports. In some examples, the control signaling transmitter 1030 is capable of, configured to, or operable to support a means for transmitting, to the UE, a second control signaling indicating the subset of antenna ports of the second set of multiple antenna ports that the UE is to use for the uplink sounding, the second control signaling being based on the second capability message, where the one or more SRSs are transmitted via the subset of antenna ports indicated by the second control signaling.

In some examples, to support transmitting the control signaling, the control signaling transmitter 1030 is capable of, configured to, or operable to support a means for transmitting, to the UE, a bitmap including the control signaling, each bit of the bitmap being associated with a respective antenna port of the set of multiple antenna ports, where the control signaling indicates the subset of antenna ports that the UE is to use for the uplink sounding based on a respective value of each bit of the bitmap.

In some examples, the bitmap indicates that the UE should refrain from using a respective antenna port of the set of multiple antenna ports for the uplink sounding based on the respective value of a bit of the bitmap that is associated with the respective antenna port being a null value.

In some examples, the bitmap is transmitted via a DCI message, an RRC message, a MAC-CE message, or any combination thereof.

In some examples, to support receiving the first capability message, the capability message receiver 1025 is capable of, configured to, or operable to support a means for receiving, from the UE, the first capability message including the indication of the set of multiple antenna ports at the UE, the set of multiple antenna ports being a subset of a plurality antenna ports configured at the UE, where the subset of antenna ports indicated by the control signaling is the same as the set of multiple antenna ports indicated by the first capability message.

In some examples, the capability message receiver 1025 is capable of, configured to, or operable to support a means for receiving, from the UE, the first capability message that indicates that the UE is capable of using a subset of antenna ports of the set of multiple antenna ports for the uplink sounding and indicates that the UE is capable of using the one or more antenna ports of the set of multiple antenna ports for the uplink sounding based on the one or more antenna ports of the set of multiple antenna ports being available for the uplink sounding. In some examples, the control signaling transmitter 1030 is capable of, configured to, or operable to support a means for transmitting, to the UE, a second control signaling indicating that the UE is to use the one or more antenna ports of the set of multiple antenna ports for the uplink sounding. In some examples, the control signaling transmitter 1030 is capable of, configured to, or operable to support a means for transmitting, to the UE, the control signaling indicating the subset of antenna ports that the UE is to use for the uplink sounding, the control signaling being based on the first capability message, where the control signaling is received after the second control signaling and indicates that the UE is to use the subset of antenna ports for the uplink sounding based on a transmission power level of a respective one or more antenna ports of the set of multiple antenna ports satisfying a transmission power level threshold.

In some examples, to support receiving the one or more SRSs, the SRS receiver 1035 is capable of, configured to, or operable to support a means for receiving, from the UE, the one or more SRSs via one or more SRS resources.

Figure 11:
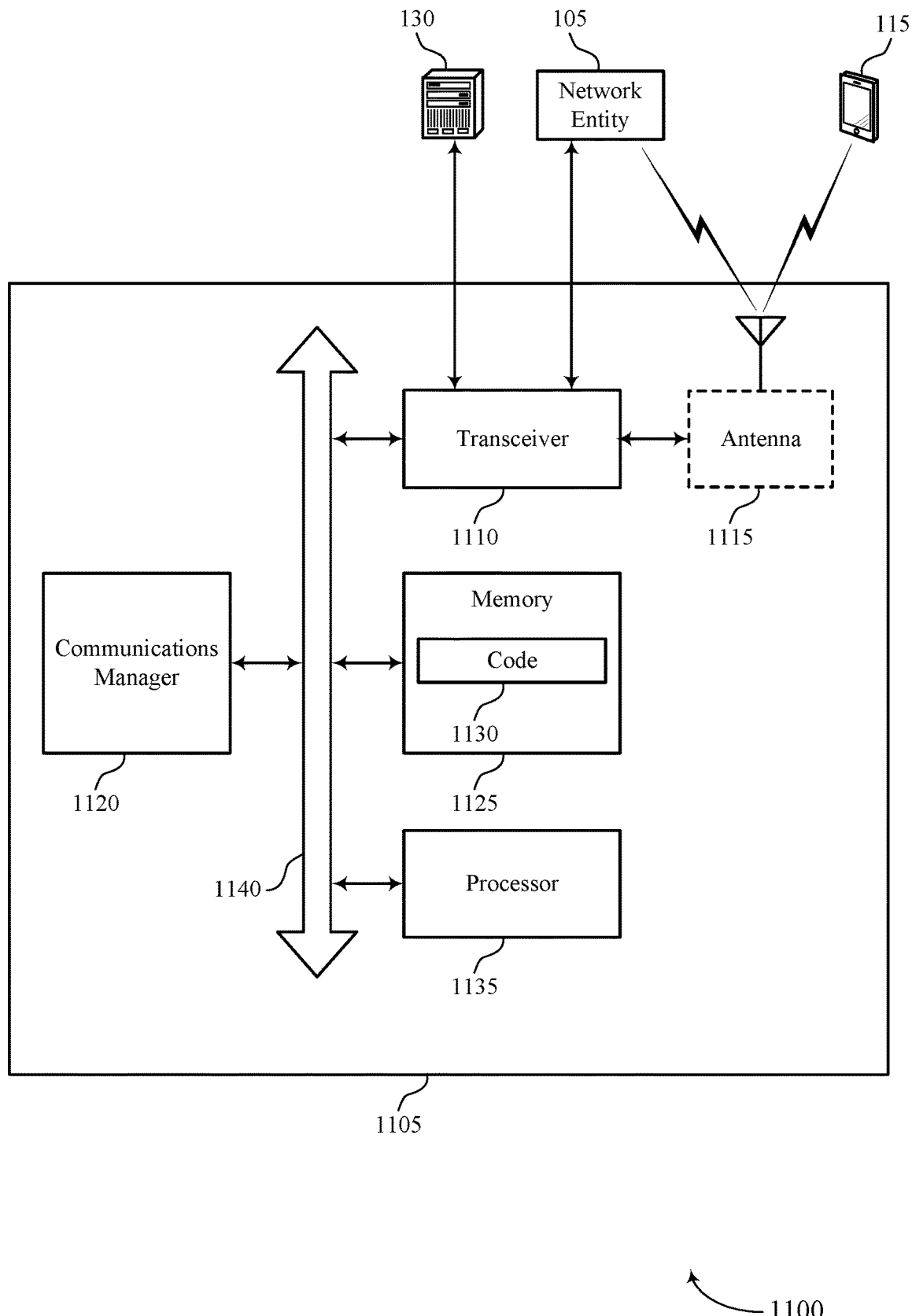
FIG. 11 shows a diagram of a system including a device that supports partial antenna uplink sounding in accordance with one or more aspects of the present disclosure.

FIG. 11 shows a diagram of a system 1100 including a device 1105 that supports partial antenna uplink sounding in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., a communication link 125, a backhaul communication link 120, a midhaul communication link 162, a fronthaul communication link 168).

The at least one memory 1125 may include RAM, ROM, or any combination thereof. The at least one memory 1125 may store computer-readable, computer-executable code 1130 including instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may contain, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting partial antenna uplink sounding). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. As such, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for receiving, from a UE, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports. The communications manager 1120 is capable of, configured to, or operable to support a means for transmitting, to the UE, control signaling indicating the subset of antenna ports of the set of multiple antenna ports that the UE is to use for the uplink sounding, the control signaling being based on the first capability message. The communications manager 1120 is capable of, configured to, or operable to support a means for receiving, from the UE, one or more SRSs via the subset of antenna ports indicated by the control signaling as part of the uplink sounding on the wireless band.

By including or configuring the communications manager 1120 in accordance with examples as described herein, the device 1105 may support techniques for a UE 115 sounding a subset of antenna ports to support improved communication reliability, reduced latency, improved user experience related to reduced latency, reduced power consumption, and more efficient utilization of communication resources.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of partial antenna uplink sounding as described herein, or the at least one processor 1135 and the at least one memory 1125 may be otherwise configured to, individually or collectively, perform or support such operations.

Figure 12:
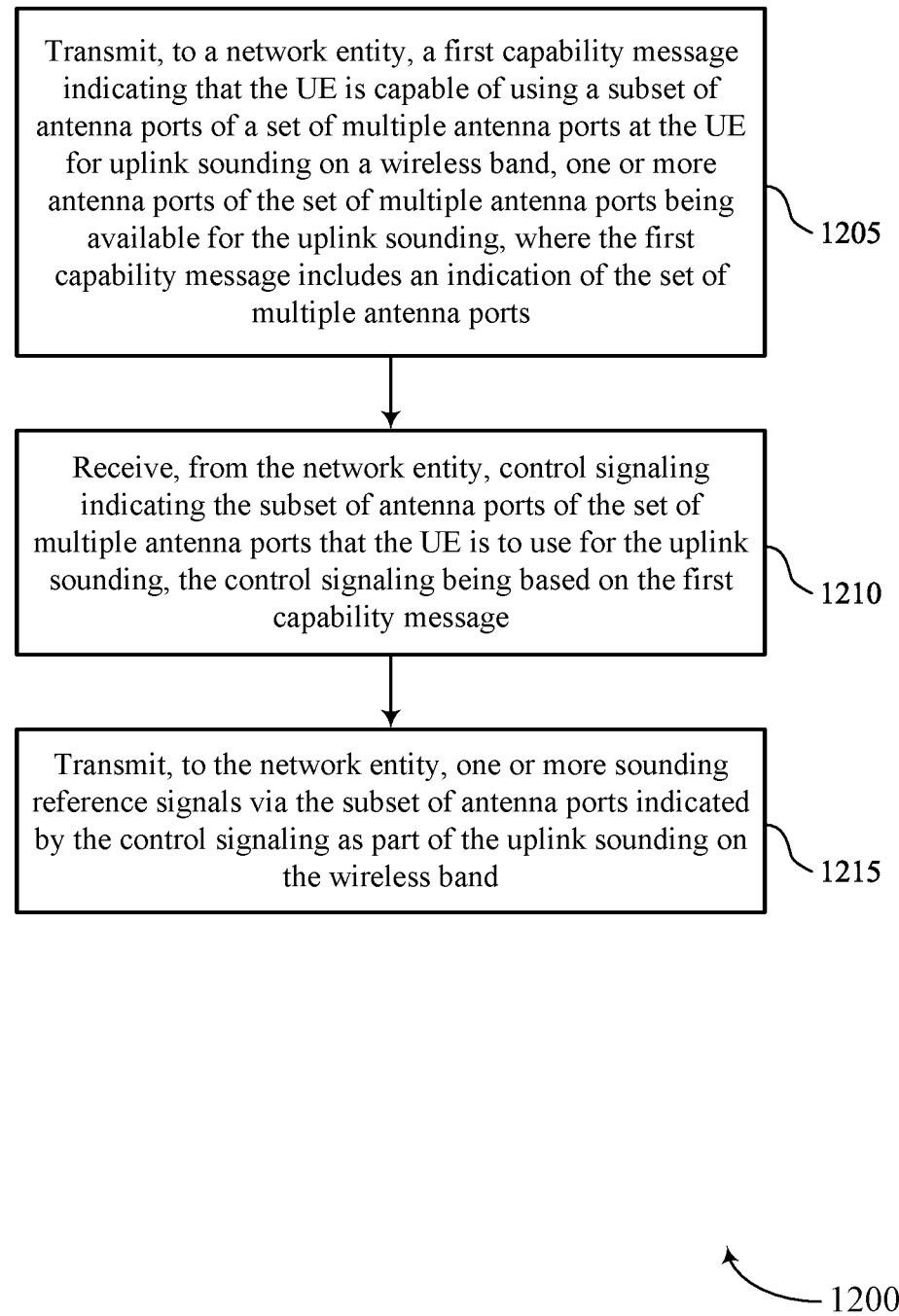
FIGS. 12 through 15 show flowcharts illustrating methods that support partial antenna uplink sounding in accordance with one or more aspects of the present disclosure.

FIG. 12 shows a flowchart illustrating a method 1200 that supports partial antenna uplink sounding in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions.

Additionally, or alternatively, the UE may perform aspects of the described functions using special-purpose hardware.

At 1205, the method may include transmitting, to a network entity, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports. The operations of block 1205 may be performed in accordance with examples as disclosed herein. In some examples, aspects of the operations of 1205 may be performed by a capability message transmitter 625 as described with reference to FIG. 6.

At 1210, the method may include receiving, from the network entity, control signaling indicating the subset of antenna ports of the set of multiple antenna ports that the UE is to use for the uplink sounding, the control signaling being based on the first capability message. The operations of block 1210 may be performed in accordance with examples as disclosed herein. In some examples, aspects of the operations of 1210 may be performed by a control signaling receiver 630 as described with reference to FIG. 6.

At 1215, the method may include transmitting, to the network entity, one or more SRSs via the subset of antenna ports indicated by the control signaling as part of the uplink sounding on the wireless band. The operations of block 1215 may be performed in accordance with examples as disclosed herein. In some examples, aspects of the operations of 1215 may be performed by an SRS transmitter 635 as described with reference to FIG. 6.

Figure 13:
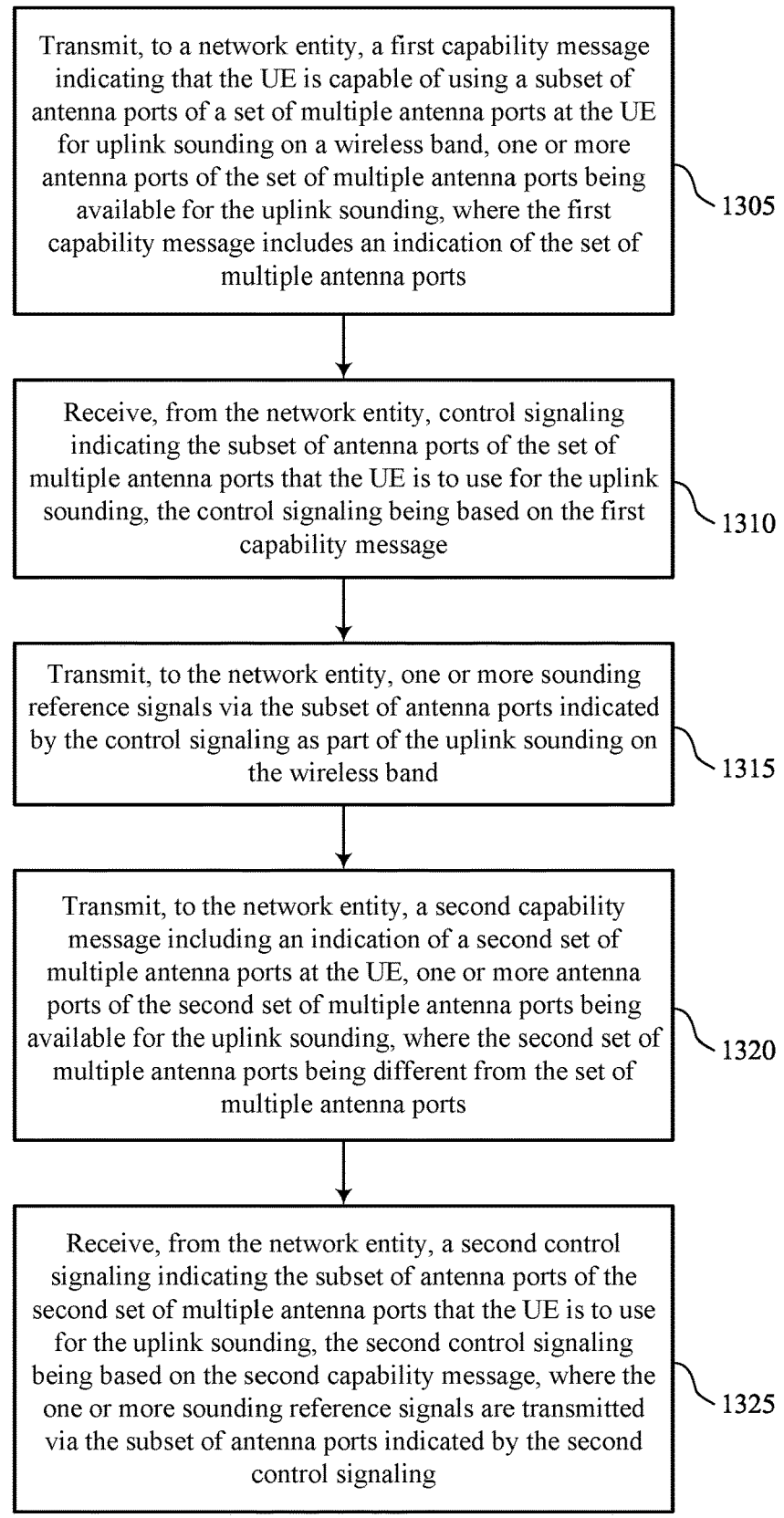

FIG. 13 shows a flowchart illustrating a method 1300 that supports partial antenna uplink sounding in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include transmitting, to a network entity, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports. The operations of block 1305 may be performed in accordance with examples as disclosed herein. In some examples, aspects of the operations of 1305 may be performed by a capability message transmitter 625 as described with reference to FIG. 6.

At 1310, the method may include receiving, from the network entity, control signaling indicating the subset of antenna ports of the set of multiple antenna ports that the UE is to use for the uplink sounding, the control signaling being based on the first capability message. The operations of block 1310 may be performed in accordance with examples as disclosed herein. In some examples, aspects of the operations of 1310 may be performed by a control signaling receiver 630 as described with reference to FIG. 6.

At 1315, the method may include transmitting, to the network entity, one or more SRSs via the subset of antenna ports indicated by the control signaling as part of the uplink sounding on the wireless band. The operations of block 1315 may be performed in accordance with examples as disclosed herein. In some examples, aspects of the operations of 1315 may be performed by an SRS transmitter 635 as described with reference to FIG. 6.

At 1320, the method may include transmitting, to the network entity, a second capability message including an indication of a second set of multiple antenna ports at the UE, one or more antenna ports of the second set of multiple antenna ports being available for the uplink sounding, where the second set of multiple antenna ports being different from the set of multiple antenna ports. The operations of block 1320 may be performed in accordance with examples as disclosed herein. In some examples, aspects of the operations of 1320 may be performed by a capability message transmitter 625 as described with reference to FIG. 6.

At 1325, the method may include receiving, from the network entity, a second control signaling indicating the subset of antenna ports of the second set of multiple antenna ports that the UE is to use for the uplink sounding, the second control signaling being based on the second capability message, where the one or more SRSs are transmitted via the subset of antenna ports indicated by the second control signaling. The operations of block 1325 may be performed in accordance with examples as disclosed herein. In some examples, aspects of the operations of 1325 may be performed by a control signaling receiver 630 as described with reference to FIG. 6.

Figure 14:
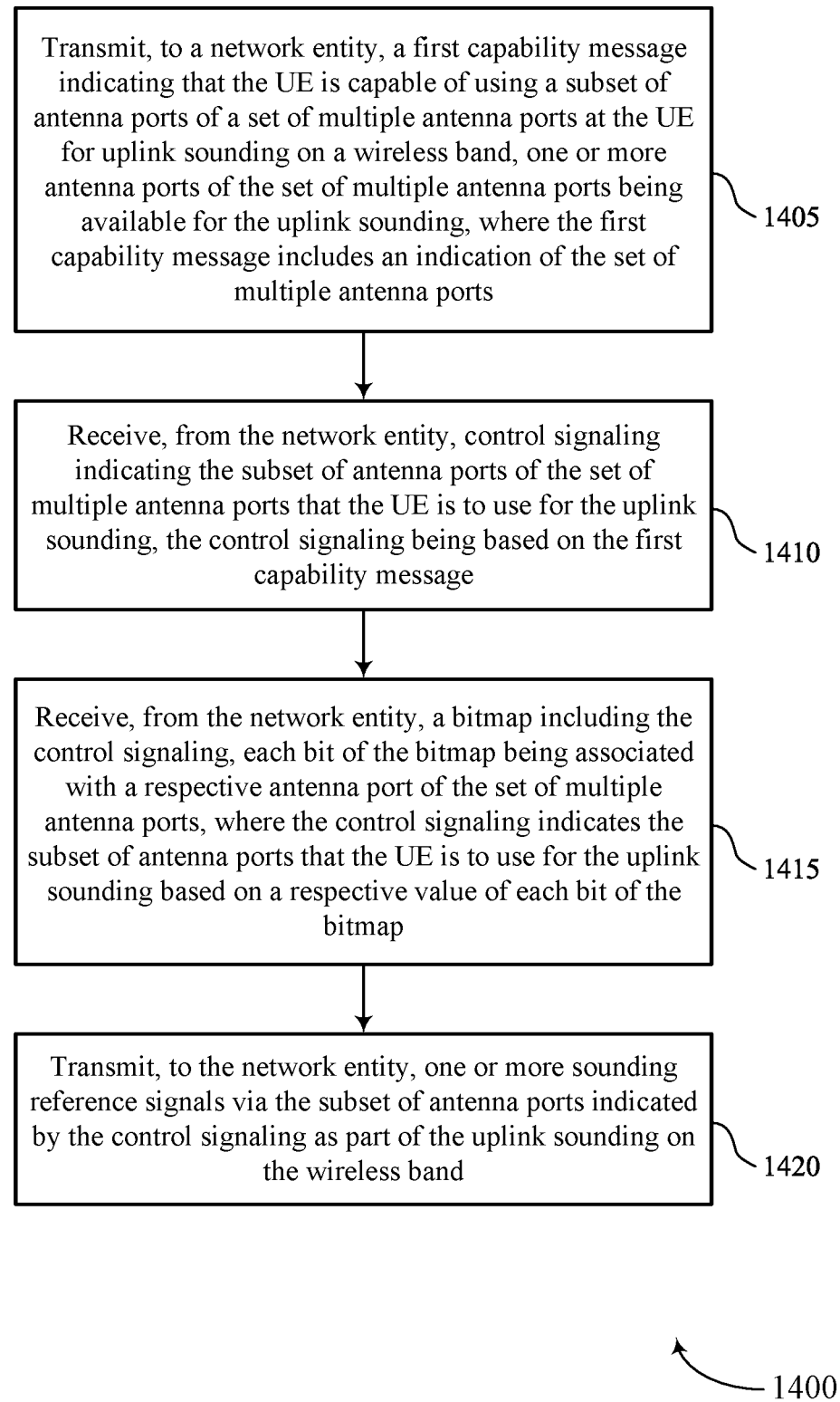

FIG. 14 shows a flowchart illustrating a method 1400 that supports partial antenna uplink sounding in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include transmitting, to a network entity, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports. The operations of block 1405 may be performed in accordance with examples as disclosed herein. In some examples, aspects of the operations of 1405 may be performed by a capability message transmitter 625 as described with reference to FIG. 6.

At 1410, the method may include receiving, from the network entity, control signaling indicating the subset of antenna ports of the set of multiple antenna ports that the UE is to use for the uplink sounding, the control signaling being based on the first capability message. The operations of block 1410 may be performed in accordance with examples as disclosed herein. In some examples, aspects of the operations of 1410 may be performed by a control signaling receiver 630 as described with reference to FIG. 6.

At 1415, the method may include receiving, from the network entity, a bitmap including the control signaling, each bit of the bitmap being associated with a respective antenna port of the set of multiple antenna ports, where the control signaling indicates the subset of antenna ports that the UE is to use for the uplink sounding based on a respective value of each bit of the bitmap. The operations of block 1415 may be performed in accordance with examples as disclosed herein. In some examples, aspects of the operations of 1415 may be performed by a control signaling receiver 630 as described with reference to FIG. 6.

At 1420, the method may include transmitting, to the network entity, one or more SRSs via the subset of antenna ports indicated by the control signaling as part of the uplink sounding on the wireless band. The operations of block 1420 may be performed in accordance with examples as disclosed herein. In some examples, aspects of the operations of 1420 may be performed by an SRS transmitter 635 as described with reference to FIG. 6.

Figure 15:
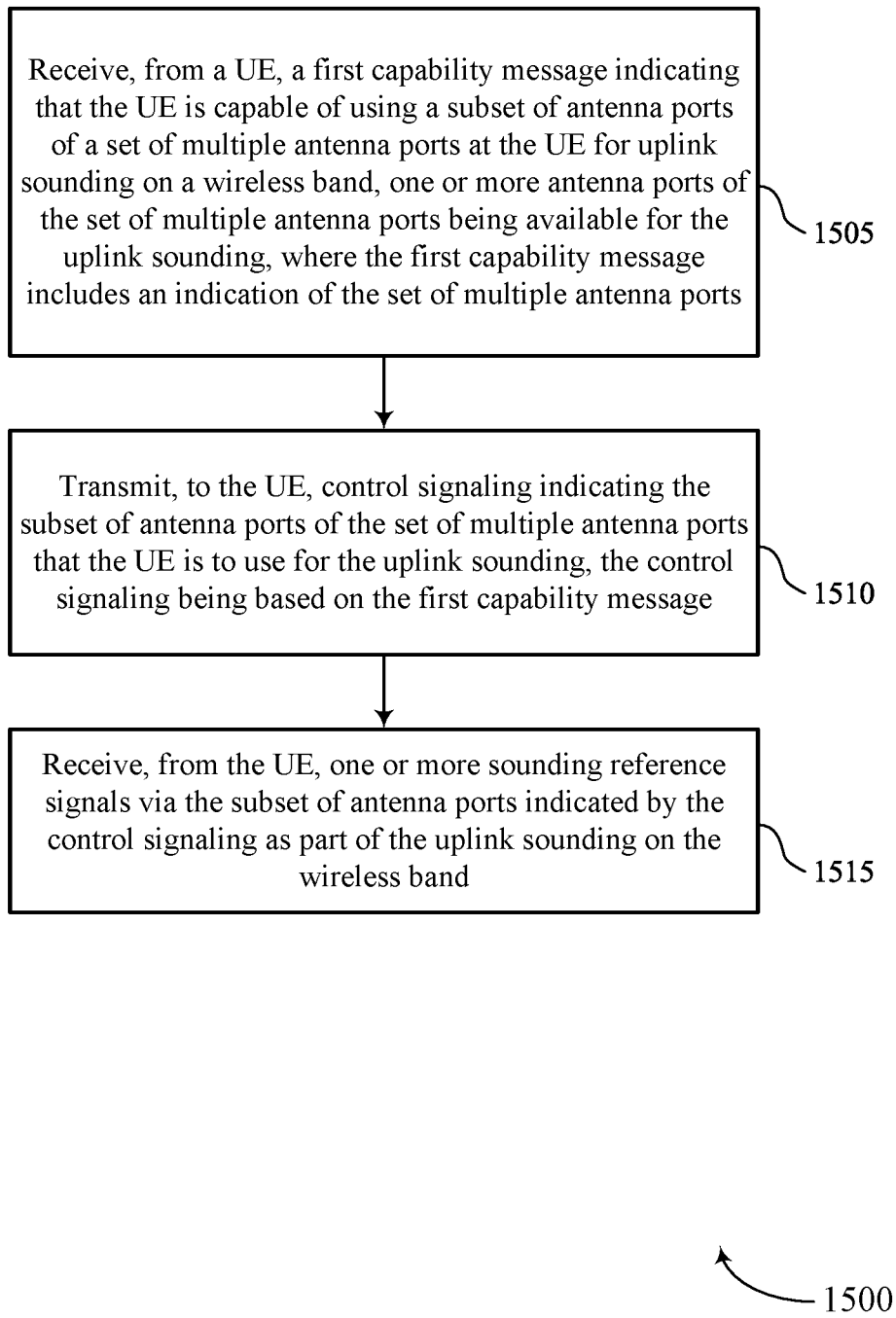

FIG. 15 shows a flowchart illustrating a method 1500 that supports partial antenna uplink sounding in accordance with aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include receiving, from a UE, a first capability message indicating that the UE is capable of using a subset of antenna ports of a set of multiple antenna ports at the UE for uplink sounding on a wireless band, one or more antenna ports of the set of multiple antenna ports being available for the uplink sounding, where the first capability message includes an indication of the set of multiple antenna ports. The operations of block 1505 may be performed in accordance with examples as disclosed herein. In some examples, aspects of the operations of 1505 may be performed by a capability message receiver 1025 as described with reference to FIG. 10.

At 1510, the method may include transmitting, to the UE, control signaling indicating the subset of antenna ports of the set of multiple antenna ports that the UE is to use for the uplink sounding, the control signaling being based on the first capability message. The operations of block 1510 may be performed in accordance with examples as disclosed herein. In some examples, aspects of the operations of 1510 may be performed by a control signaling transmitter 1030 as described with reference to FIG. 10.

At 1515, the method may include receiving, from the UE, one or more SRSs via the subset of antenna ports indicated by the control signaling as part of the uplink sounding on the wireless band. The operations of block 1515 may be performed in accordance with examples as disclosed herein. In some examples, aspects of the operations of 1515 may be performed by an SRS receiver 1035 as described with reference to FIG. 10.

The following provides an overview of aspects of the present disclosure:

Aspect 1: A method for wireless communications by a UE, comprising: transmitting, to a network entity, a first capability message indicating that the UE is capable of using a subset of antenna ports of a plurality of antenna ports at the UE for uplink sounding on a wireless band, one or more antenna ports of the plurality of antenna ports being available for the uplink sounding, wherein the first capability message comprises an indication of the plurality of antenna ports; receiving, from the network entity, control signaling indicating the subset of antenna ports of the plurality of antenna ports that the UE is to use for the uplink sounding, the control signaling being based at least in part on the first capability message; and transmitting, to the network entity, one or more SRSs via the subset of antenna ports indicated by the control signaling as part of the uplink sounding on the wireless band.

Aspect 2: The method of aspect 1, further comprising: transmitting, to the network entity, a second capability message comprising an indication of a second plurality of antenna ports at the UE, one or more antenna ports of the second plurality of antenna ports being available for the uplink sounding, wherein the second plurality of antenna ports being different from the plurality of antenna ports; and receiving, from the network entity, a second control signaling indicating the subset of antenna ports of the second plurality of antenna ports that the UE is to use for the uplink sounding, the second control signaling being based at least in part on the second capability message, wherein the one or more SRSs are transmitted via the subset of antenna ports indicated by the second control signaling.

Aspect 3: The method of any of aspects 1 through 2, wherein receiving the control signaling further comprises: receiving, from the network entity, a bitmap comprising the control signaling, each bit of the bitmap being associated with a respective antenna port of the plurality of antenna ports, wherein the control signaling indicates the subset of antenna ports that the UE is to use for the uplink sounding based at least in part on a respective value of each bit of the bitmap.

Aspect 4: The method of aspect 3, wherein the bitmap indicates that the UE should refrain from using a respective antenna port of the plurality of antenna ports for the uplink sounding based at least in part on the respective value of a bit of the bitmap that is associated with the respective antenna port being a null value.

Aspect 5: The method of any of aspects 3 through 4, wherein the bitmap is received via a DCI message, an RRC message, a MAC-CE message, or any combination thereof.

Aspect 6: The method of any of aspects 1 through 5, wherein transmitting the first capability message further comprises: transmitting, to the network entity, the first capability message comprising the indication of the plurality of antenna ports at the UE, the plurality of antenna ports being a subset of a plurality antenna ports configured at the UE, wherein the subset of antenna ports indicated by the control signaling is the same as the plurality of antenna ports indicated by the first capability message.

Aspect 7: The method of any of aspects 1 through 6, further comprising: transmitting, to the network entity, the first capability message that indicates that the UE is capable of using a subset of antenna ports of the plurality of antenna ports for the uplink sounding and indicates that the UE is capable of using the one or more antenna ports of the plurality of antenna ports for the uplink sounding based at least in part on the one or more antenna ports of the plurality of antenna ports being available for the uplink sounding; receiving, from the network entity, a second control signaling indicating that the UE is to use the one or more antenna ports of the plurality of antenna ports for the uplink sounding; and receiving, from the network entity, the control signaling indicating the subset of antenna ports that the UE is to use for the uplink sounding, the control signaling being based at least in part on the first capability message, wherein the control signaling is received after the second control signaling and indicates that the UE is to use the subset of antenna ports for the uplink sounding based at least in part on a transmission power level of a respective one or more antenna ports of the plurality of antenna ports satisfying a transmission power level threshold.

Aspect 8: The method of any of aspects 1 through 7, wherein transmitting the one or more SRSs further comprises: transmitting, to the network entity, the one or more SRSs via one or more SRS resources.

Aspect 9: The method of any of aspects 1 through 8, wherein transmitting the first capability message is based at least in part on a type of receiver associated with the plurality of antenna ports at the UE that are available for the uplink sounding.

Aspect 10: A method for wireless communications by a network entity, comprising: receiving, from a UE, a first capability message indicating that the UE is capable of using a subset of antenna ports of a plurality of antenna ports at the UE for uplink sounding on a wireless band, one or more antenna ports of the plurality of antenna ports being available for the uplink sounding, wherein the first capability message comprises an indication of the plurality of antenna ports; transmitting, to the UE, control signaling indicating the subset of antenna ports of the plurality of antenna ports that the UE is to use for the uplink sounding, the control signaling being based at least in part on the first capability message; and receiving, from the UE, one or more SRSs via the subset of antenna ports indicated by the control signaling as part of the uplink sounding on the wireless band.

Aspect 11: The method of aspect 10, further comprising: receiving, from the UE, a second capability message comprising an indication of a second plurality of antenna ports at the UE, one or more antenna ports of the second plurality of antenna ports being available for the uplink sounding, wherein the second plurality of antenna ports being different from the plurality of antenna ports; and transmitting, to the UE, a second control signaling indicating the subset of antenna ports of the second plurality of antenna ports that the UE is to use for the uplink sounding, the second control signaling being based at least in part on the second capability message, wherein the one or more SRSs are transmitted via the subset of antenna ports indicated by the second control signaling.

Aspect 12: The method of any of aspects 10 through 11, wherein transmitting the control signaling further comprises: transmitting, to the UE, a bitmap comprising the control signaling, each bit of the bitmap being associated with a respective antenna port of the plurality of antenna ports, wherein the control signaling indicates the subset of antenna ports that the UE is to use for the uplink sounding based at least in part on a respective value of each bit of the bitmap.

Aspect 13: The method of aspect 12, wherein the bitmap indicates that the UE should refrain from using a respective antenna port of the plurality of antenna ports for the uplink sounding based at least in part on the respective value of a bit of the bitmap that is associated with the respective antenna port being a null value.

Aspect 14: The method of any of aspects 12 through 13, wherein the bitmap is transmitted via a DCI message, an RRC message, a MAC-CE message, or any combination thereof.

Aspect 15: The method of any of aspects 10 through 14, wherein receiving the first capability message further comprises: receiving, from the UE, the first capability message comprising the indication of the plurality of antenna ports at the UE, the plurality of antenna ports being a subset of a plurality antenna ports configured at the UE, wherein the subset of antenna ports indicated by the control signaling is the same as the plurality of antenna ports indicated by the first capability message.

Aspect 16: The method of any of aspects 10 through 15, further comprising: receiving, from the UE, the first capability message that indicates that the UE is capable of using a subset of antenna ports of the plurality of antenna ports for the uplink sounding and indicates that the UE is capable of using the one or more antenna ports of the plurality of antenna ports for the uplink sounding based at least in part on the one or more antenna ports of the plurality of antenna ports being available for the uplink sounding; transmitting, to the UE, a second control signaling indicating that the UE is to use the one or more antenna ports of the plurality of antenna ports for the uplink sounding; and transmitting, to the UE, the control signaling indicating the subset of antenna ports that the UE is to use for the uplink sounding, the control signaling being based at least in part on the first capability message, wherein the control signaling is received after the second control signaling and indicates that the UE is to use the subset of antenna ports for the uplink sounding based at least in part on a transmission power level of a respective one or more antenna ports of the plurality of antenna ports satisfying a transmission power level threshold.

Aspect 17: The method of any of aspects 10 through 16, wherein receiving the one or more SRSs further comprises: receiving, from the UE, the one or more SRSs via one or more SRS resources.

Aspect 18: A UE for wireless communications, comprising one or more memories storing processor-executable code, and one or more processors coupled with the one or more memories and individually or collectively operable to execute the code to cause the UE to perform a method of any of aspects 1 through 9.

Aspect 19: A UE for wireless communications, comprising at least one means for performing a method of any of aspects 1 through 9.

Aspect 20: A non-transitory computer-readable medium storing code for wireless communications, the code comprising instructions executable by a processor to perform a method of any of aspects 1 through 9.

Aspect 21: A network entity for wireless communications, comprising one or more memories storing processor-executable code, and one or more processors coupled with the one or more memories and individually or collectively operable to execute the code to cause the network entity to perform a method of any of aspects 10 through 17.

Aspect 22: A network entity for wireless communications, comprising at least one means for performing a method of any of aspects 10 through 17.

Aspect 23: A non-transitory computer-readable medium storing code for wireless communications, the code comprising instructions executable by a processor to perform a method of any of aspects 10 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory)

and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
transmit, to a network entity, a first capability message indicating that the UE is capable of using a subset of antenna ports of a plurality of antenna ports at the UE for uplink sounding on a wireless band, one or more antenna ports of the plurality of antenna ports being available for the uplink sounding, wherein the first capability message comprises an indication of the plurality of antenna ports;
receive, from the network entity, control signaling comprising a bit map, the control signaling indicating the subset of antenna ports of the plurality of antenna ports that the UE is to use for the uplink sounding, the control signaling being based at least in part on the first capability message; and
transmit, to the network entity, one or more sounding reference signals via the subset of antenna ports indicated by the control signaling as part of the uplink sounding on the wireless band;
wherein each bit of the bitmap is associated with a respective antenna port of the plurality of antenna ports; and
wherein the control signaling indicates the subset of antenna ports that the UE is to use for the uplink sounding based at least in part on a respective value of each bit of the bitmap.

2. The UE of claim 1, wherein the one or more processors are individually or collectively further operable to execute the code to cause the UE to:
transmit, to the network entity, a second capability message comprising an indication of a second plurality of antenna ports at the UE, one or more antenna ports of the second plurality of antenna ports being available for the uplink sounding, wherein the second plurality of antenna ports being different from the plurality of antenna ports; and
receive, from the network entity, a second control signaling indicating the subset of antenna ports of the second plurality of antenna ports that the UE is to use for the uplink sounding, the second control signaling being based at least in part on the second capability message, wherein the one or more sounding reference signals are transmitted via the subset of antenna ports indicated by the second control signaling.

3. The UE of claim 1, wherein the bitmap indicates that the UE should refrain from using a respective antenna port of the plurality of antenna ports for the uplink sounding based at least in part on the respective value of a bit of the bitmap that is associated with the respective antenna port being a null value.

4. The UE of claim 1, wherein the bitmap is received via a downlink control information message, a radio resource control message, a medium access control control element message, or any combination thereof.

5. The UE of claim 1, wherein, to transmit the first capability message, the one or more processors are individually or collectively further operable to execute the code to cause the UE to:
transmit, to the network entity, the first capability message comprising the indication of the plurality of antenna ports at the UE, the plurality of antenna ports being a subset of a plurality antenna ports configured at the UE, wherein the subset of antenna ports indicated by the control signaling is the same as the plurality of antenna ports indicated by the first capability message.

6. The UE of claim 1, wherein the one or more processors are individually or collectively further operable to execute the code to cause the UE to:
transmit, to the network entity, the first capability message that indicates that the UE is capable of using a subset of antenna ports of the plurality of antenna ports for the uplink sounding and indicates that the UE is capable of using the one or more antenna ports of the plurality of antenna ports for the uplink sounding based at least in part on the one or more antenna ports of the plurality of antenna ports being available for the uplink sounding;
receive, from the network entity, a second control signaling indicating that the UE is to use the one or more antenna ports of the plurality of antenna ports for the uplink sounding; and
receive, from the network entity, the control signaling indicating the subset of antenna ports that the UE is to use for the uplink sounding, the control signaling being based at least in part on the first capability message, wherein the control signaling is received after the second control signaling and indicates that the UE is to use the subset of antenna ports for the uplink sounding based at least in part on a transmission power level of a respective one or more antenna ports of the plurality of antenna ports satisfying a transmission power level threshold.

7. The UE of claim 1, wherein, to transmit the one or more sounding reference signals, the one or more processors are individually or collectively further operable to execute the code to cause the UE to:
  transmit, to the network entity, the one or more sounding reference signals via one or more sounding reference signal resources.

8. The UE of claim 1, wherein transmitting the first capability message is based at least in part on a type of receiver associated with the plurality of antenna ports at the UE that are available for the uplink sounding.

9. A network entity, comprising:
  one or more memories storing processor-executable code; and
  one or more processors coupled with the one or more memories and individually or collectively operable to execute the code to cause the network entity to:
    receive, from a user equipment (UE), a first capability message indicating that the UE is capable of using a subset of antenna ports of a plurality of antenna ports at the UE for uplink sounding on a wireless band, one or more antenna ports of the plurality of antenna ports being available for the uplink sounding, wherein the first capability message comprises an indication of the plurality of antenna ports;
    transmit, to the UE, control signaling indicating the subset of antenna ports of the plurality of antenna ports that the UE is to use for the uplink sounding, the control signaling being based at least in part on the first capability message;
    receive, from the UE, one or more sounding reference signals via the subset of antenna ports indicated by the control signaling as part of the uplink sounding on the wireless band; and
    receive, from the UE, a second capability message comprising an indication of a second plurality of antenna ports at the UE, one or more antenna ports of the second plurality of antenna ports being available for the uplink sounding, wherein the second plurality of antenna ports being different from the plurality of antenna ports; and
    transmit, to the UE, a second control signaling indicating the subset of antenna ports of the second plurality of antenna ports that the UE is to use for the uplink sounding, the second control signaling being based at least in part on the second capability message, wherein the one or more sounding reference signals are transmitted via the subset of antenna ports indicated by the second control signaling.

10. The network entity of claim 9, wherein, to transmit the control signaling, the one or more processors are individually or collectively further operable to execute the code to cause the network entity to:
  transmit, to the UE, a bitmap comprising the control signaling, each bit of the bitmap being associated with a respective antenna port of the plurality of antenna ports, wherein the control signaling indicates the subset of antenna ports that the UE is to use for the uplink sounding based at least in part on a respective value of each bit of the bitmap.

11. The network entity of claim 10, wherein the bitmap indicates that the UE should refrain from using a respective antenna port of the plurality of antenna ports for the uplink sounding based at least in part on the respective value of a bit of the bitmap that is associated with the respective antenna port being a null value.

12. The network entity of claim 10, wherein the bitmap is transmitted via a downlink control information message, a radio resource control message, a medium access control control element message, or any combination thereof.

13. The network entity of claim 9, wherein, to receive the first capability message, the one or more processors are individually or collectively further operable to execute the code to cause the network entity to:
  receive, from the UE, the first capability message comprising the indication of the plurality of antenna ports at the UE, the plurality of antenna ports being a subset of a plurality antenna ports configured at the UE, wherein the subset of antenna ports indicated by the control signaling is the same as the plurality of antenna ports indicated by the first capability message.

14. The network entity of claim 9, wherein, to receive the one or more sounding reference signals, the one or more processors are individually or collectively further operable to execute the code to cause the network entity to:
  receive, from the UE, the one or more sounding reference signals via one or more sounding reference signal resources.

15. A method for wireless communications by a user equipment (UE), comprising:
  transmitting, to a network entity, a first capability message indicating that the UE is capable of using a subset of antenna ports of a plurality of antenna ports at the UE for uplink sounding on a wireless band, one or more antenna ports of the plurality of antenna ports being available for the uplink sounding, wherein the first capability message comprises an indication of the plurality of antenna ports;
  receiving, from the network entity, control signaling indicating the subset of antenna ports of the plurality of antenna ports that the UE is to use for the uplink sounding, the control signaling being based at least in part on the first capability message;
  transmitting, to the network entity, one or more sounding reference signals via the subset of antenna ports indicated by the control signaling as part of the uplink sounding on the wireless band;
  transmitting, to the network entity, a second capability message comprising an indication of a second plurality of antenna ports at the UE, one or more antenna ports of the second plurality of antenna ports being available for the uplink sounding, wherein the second plurality of antenna ports being different from the plurality of antenna ports; and
  receiving, from the network entity, a second control signaling indicating the subset of antenna ports of the second plurality of antenna ports that the UE is to use for the uplink sounding, the second control signaling being based at least in part on the second capability message, wherein the one or more sounding reference signals are transmitted via the subset of antenna ports indicated by the second control signaling.

16. The method of claim 15, wherein receiving the control signaling further comprises:
  receiving, from the network entity, a bitmap comprising the control signaling, each bit of the bitmap being associated with a respective antenna port of the plurality of antenna ports, wherein the control signaling indicates the subset of antenna ports that the UE is to use for the uplink sounding based at least in part on a respective value of each bit of the bitmap.

17. The method of claim 16, wherein the bitmap indicates that the UE should refrain from using a respective antenna port of the plurality of antenna ports for the uplink sounding based at least in part on the respective value of a bit of the bitmap that is associated with the respective antenna port being a null value.

18. The method of claim 15, wherein transmitting the first capability message further comprises:
transmitting, to the network entity, the first capability message comprising the indication of the plurality of antenna ports at the UE, the plurality of antenna ports being a subset of a plurality antenna ports configured at the UE, wherein the subset of antenna ports indicated by the control signaling is the same as the plurality of antenna ports indicated by the first capability message.

19. The method of claim 15, wherein transmitting the first capability message is based at least in part on a type of receiver associated with the plurality of antenna ports at the UE that are available for the uplink sounding.

20. A method for wireless communications by a network entity, comprising:
receiving, from a user equipment (UE), a first capability message indicating that the UE is capable of using a subset of antenna ports of a plurality of antenna ports at the UE for uplink sounding on a wireless band, one or more antenna ports of the plurality of antenna ports being available for the uplink sounding, wherein the first capability message comprises an indication of the plurality of antenna ports;
transmitting, to the UE, control signaling comprising a bit map, the control signaling indicating the subset of antenna ports of the plurality of antenna ports that the UE is to use for the uplink sounding, the control signaling being based at least in part on the first capability message; and
receiving, from the UE, one or more sounding reference signals via the subset of antenna ports indicated by the control signaling as part of the uplink sounding on the wireless band;
wherein each bit of the bitmap is associated with a respective antenna port of the plurality of antenna ports; and
wherein the control signaling indicates the subset of antenna ports that the UE is to use for the uplink sounding based at least in part on a respective value of each bit of the bitmap.

21. The method of claim 20, further comprising:
receiving, from the UE, a second capability message comprising an indication of a second plurality of antenna ports at the UE, one or more antenna ports of the second plurality of antenna ports being available for the uplink sounding, wherein the second plurality of antenna ports being different from the plurality of antenna ports; and
transmitting, to the UE, a second control signaling indicating the subset of antenna ports of the second plurality of antenna ports that the UE is to use for the uplink sounding, the second control signaling being based at least in part on the second capability message, wherein the one or more sounding reference signals are transmitted via the subset of antenna ports indicated by the second control signaling.

22. The method of claim 20, wherein the bitmap indicates that the UE should refrain from using a respective antenna port of the plurality of antenna ports for the uplink sounding based at least in part on the respective value of a bit of the bitmap that is associated with the respective antenna port being a null value.

23. The method of claim 20, wherein receiving the first capability message further comprises:
receiving, from the UE, the first capability message comprising the indication of the plurality of antenna ports at the UE, the plurality of antenna ports being a subset of a plurality antenna ports configured at the UE, wherein the subset of antenna ports indicated by the control signaling is the same as the plurality of antenna ports indicated by the first capability message.

24. The method of claim 20, further comprising:
receiving, from the UE, the first capability message that indicates that the UE is capable of using a subset of antenna ports of the plurality of antenna ports for the uplink sounding and indicates that the UE is capable of using the one or more antenna ports of the plurality of antenna ports for the uplink sounding based at least in part on the one or more antenna ports of the plurality of antenna ports being available for the uplink sounding;
transmitting, to the UE, a second control signaling indicating that the UE is to use the one or more antenna ports of the plurality of antenna ports for the uplink sounding; and
transmitting, to the UE, the control signaling indicating the subset of antenna ports that the UE is to use for the uplink sounding, the control signaling being based at least in part on the first capability message, wherein the control signaling is received after the second control signaling and indicates that the UE is to use the subset of antenna ports for the uplink sounding based at least in part on a transmission power level of a respective one or more antenna ports of the plurality of antenna ports satisfying a transmission power level threshold.

\* \* \* \* \*